(12) United States Patent
Roetter et al.

(10) Patent No.: US 11,100,518 B2
(45) Date of Patent: Aug. 24, 2021

(54) SYSTEMS AND METHODS FOR DETERMINING USER ACTIONS

(71) Applicant: Google LLC, Mountain View, CA (US)

(72) Inventors: Alex Roetter, San Francisco, CA (US); Deepak Jindal, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/375,568

(22) Filed: Apr. 4, 2019

(65) Prior Publication Data

US 2019/0236615 A1 Aug. 1, 2019

Related U.S. Application Data

(63) Continuation of application No. 10/813,356, filed on Mar. 31, 2004, which is a continuation-in-part of application No. 10/653,899, filed on Sep. 4, 2003, now abandoned.

(51) Int. Cl.
G06Q 30/00 (2012.01)
G06Q 30/02 (2012.01)

(52) U.S. Cl.
CPC ......... *G06Q 30/02* (2013.01); *G06Q 30/0243* (2013.01); *G06Q 30/0255* (2013.01); *G06Q 30/0258* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 5,930,772 A | 7/1999 | Gomyo et al. | |
| 5,948,061 A | 9/1999 | Merriman et al. | |
| 6,006,197 A | 12/1999 | D'eon et al. | |
| 6,016,504 A | 1/2000 | Arnold et al. | |
| 6,134,532 A | 10/2000 | Lazarus et al. | |
| 6,285,999 B1 | 9/2001 | Page | |
| 6,421,675 B1 | 7/2002 | Ryan et al. | |
| 6,928,426 B2 | 8/2005 | Dake | |
| 7,383,377 B2 | 6/2008 | Arataki et al. | |
| 2002/0004733 A1* | 1/2002 | Addante | G06Q 30/02 705/14.51 |
| 2002/0016717 A1 | 2/2002 | Ponzio, Jr. | |
| 2002/0040318 A1 | 4/2002 | Amano et al. | |
| 2002/0078192 A1 | 6/2002 | Kopsell et al. | |

(Continued)

FOREIGN PATENT DOCUMENTS

| | | |
|---|---|---|
| EP | 1 083 504 A2 | 3/2001 |
| KR | 19990053067 | 7/1999 |

(Continued)

OTHER PUBLICATIONS

Brin et al., "The Anatomy of a Large-Scale Hypertextual Search Engine," Seventh International World Wide Web Conference, Brisbane, Australia, Apr. 14-18, 1998, 20 pages.

(Continued)

*Primary Examiner* — Michael Bekerman
(74) *Attorney, Agent, or Firm* — Foley & Lardner LLP

(57) ABSTRACT

A system tracks user actions associated with advertisements. The system may receive information in response to a user action. The system may then determine whether the action performed by the user resulted from an advertisement.

20 Claims, 17 Drawing Sheets

(56) References Cited

U.S. PATENT DOCUMENTS

| | | | |
|---|---|---|---|
| 2002/0103698 A1 | 8/2002 | Cantrell | |
| 2003/0014304 A1 | 1/2003 | Calvert et al. | |
| 2003/0097564 A1 | 5/2003 | Tewari et al. | |
| 2003/0109249 A1 | 6/2003 | Frantz | |
| 2003/0195837 A1 | 10/2003 | Kostic et al. | |
| 2004/0044571 A1* | 3/2004 | Bronnimann | G06Q 30/02 705/14.71 |
| 2004/0059708 A1 | 3/2004 | Dean et al. | |
| 2004/0153367 A1 | 8/2004 | Lapstun et al. | |
| 2004/0215515 A1* | 10/2004 | Perry | G06Q 30/02 705/14.54 |
| 2005/0006466 A1 | 1/2005 | Overhultz et al. | |
| 2005/0055269 A1 | 3/2005 | Roetter et al. | |
| 2005/0097040 A1 | 5/2005 | Chen et al. | |
| 2005/0160002 A1 | 7/2005 | Roetter et al. | |
| 2005/0273388 A1 | 12/2005 | Roetter | |
| 2006/0031117 A1 | 2/2006 | Zohar et al. | |
| 2006/0116924 A1 | 6/2006 | Angles et al. | |
| 2006/0149641 A1 | 7/2006 | Loeb et al. | |
| 2007/0033104 A1 | 2/2007 | Collins et al. | |
| 2007/0088609 A1* | 4/2007 | Reller | G06Q 30/0275 705/14.71 |
| 2007/0131177 A1 | 6/2007 | Perkitny | |
| 2007/0260516 A1 | 11/2007 | Schoen et al. | |
| 2008/0010112 A1 | 1/2008 | Kniaz et al. | |
| 2008/0010143 A1 | 1/2008 | Kniaz et al. | |
| 2008/0065474 A1 | 3/2008 | Sharma et al. | |
| 2008/0255915 A1 | 10/2008 | Collins et al. | |

FOREIGN PATENT DOCUMENTS

| | | |
|---|---|---|
| KR | 2000-0030679 A | 6/2000 |
| KR | 20030043827 A | 6/2003 |
| WO | WO-99/54828 A | 10/1999 |
| WO | WO 01/09789 | 2/2001 |
| WO | WO-01/09789 A1 | 2/2001 |
| WO | WO-01/39023 | 5/2001 |
| WO | WO-01/41030 A1 | 6/2001 |
| WO | WO-03/050744 A1 | 6/2003 |
| WO | WO-2004/084097 A1 | 9/2004 |
| WO | WO-2005/098714 A2 | 10/2005 |

OTHER PUBLICATIONS

CA Office Action for CA Applicaiton No. 2,561,779, dated Oct. 30, 2014, 3 pages.
CA Office Action on CA Patent Application No. 2,578,410 dated Jul. 31, 2014, 4 pages.
Canadian Office Action for Application No. CA 2,578,410, dated Jul. 22, 2013, 4 pages.
Canadian Office Action for CA Application No. 2,561,779 dated Nov. 27, 2015, 3 pages.
Chinese Office Action for CN Application No. 200580015719.1 dated Sep. 9, 2015, 18 pages.
Copending U.S. Appl. No. 11/520,351, filed Sep. 12, 2006, Abhinay Sharma et al., "Secure Conversion Tracking," 33 pages.
U.S. Appl. No. 10/653,899 filed by Roetter et al. on Sep. 4, 2003, "Systems and Methods for Determining User Actions," 41 pages.
U.S. Appl. No. 10/813,356 filed by Roetter et al. on Mar. 31, 2004, "Systems and Methods for Determining User Actions," 76 pages.
EP Examination Report for EP Application No. 05 733817 dated Oct. 24, 2016, 8 pages.
EP Official Communication on EP 05733817.0 dated May 2, 2013.
Final Office Action on U.S. Appl. No. 14/255,533 dated Sep. 10, 2018.
International Search Report for PCT/US2005/010866, dated Aug. 1, 2007, 4 pages.
International Search Report/Written Opinion for PCT Application No. PCT/US2007/71950, dated Nov. 21, 2008, 3 pages.
International Search Report/Written Opinion for PCT Application No. PCT/US2007/78200, dated Feb. 26, 2008, 3 pages.
Kristol et al., "RFC2109—HTTP State Management Mechanism," Feb. 1997,http://www.faqs.org/rfcs/rfc2109.html, 17 pages.
Notice of Allowance on U.S. Appl. No. 14/255,533 dated Jul. 3, 2019.
Supplemental European Search Report corresponding to EP 05 73 3817, dated Jul. 23, 2008, 4 pages.
U.S. Office Action on U.S. Appl. No. 11/477,134 dated Dec. 2, 2008, 9 pages.
U.S. Office Action on U.S. Appl. No. 11/477,134 dated Dec. 3, 2009, 18 pages.
U.S. Office Action on U.S. Appl. No. 11/477,134 dated May 27, 2009, 13 pages.
U.S. Office Action on U.S. Appl. No. 11/477,134 dated Jul. 2, 2010, 21 pages.
U.S. Notice of Allowance on U.S. Appl. No. 10/923,034 dated Dec. 9, 2013, 12 pages.
U.S. Notice of Allowance on U.S. Appl. No. 10/923,034 dated Sep. 11, 2013, 11 pages.
U.S. Office Action for U.S. Appl. No. 10/653,899, dated Oct. 6, 2009, 16 pages.
U.S. Office Action for U.S. Appl. No. 10/813,356, dated Mar. 8, 2011, 19 pages.
U.S. Office Action for U.S. Appl. No. 10/813,356, dated Oct. 5, 2011, 8 pages.
U.S. Office Action U.S. Appl. No. 10/923,034, dated Nov. 23, 2011, 10 pages.
U.S. Office Action for U.S. Appl. No. 10/923,034, dated May 10, 2011, 20 pages.
U.S. Office Action for U.S. Appl. No. 10/813,356 dated Aug. 10, 2017, 12 pages.
U.S. Office Action for U.S. Appl. No. 10/813,356 dated Feb. 23, 2018, 12 pages.
U.S. Office Action for U.S. Appl. No. 14/255,533 dated Feb. 23, 2018, 7 pages.
U.S. Office Action for U.S. Appl. No. 18/813,356 dated Jun. 1, 2015, 9 pages.
U.S. Office Action on 098981-0842 dated Oct. 3, 2014.
Garfinkel, Simson, "Browser Cookies are Persistent, Not Necessarily Evil", Science, Wired, Dec. 11, 1996, retrieved Nov. 5, 2020 from URL: https://www.wired.com/1996/12/browser-cookies-are-persistent-not-necessarily-evil/ (3 pages).
Non-Final Office Action for U.S. Appl. No. 10/653,899 dated Dec. 23, 2008 (16 pages).
Notice of Allowance for U.S. Appl. No. 10/813,356 dated Nov. 24, 2020 (10 pages).
Notice of Allowance for U.S. Appl. No. 14/255,533 dated Nov. 5, 2019 (8 pages).
Notice of Allowance for U.S. Appl. No. 10/813,356 dated Feb. 22, 2021 (10 pages).

* cited by examiner

900

1000

Advertising Performance

Directions

Copy & paste these URLs in you other ad campaign's interface [?]

| Keyword | Destination URL |
|---|---|
| keyword 1 | http://www.googleadservices.com/pagead/adclick?clickinfo=sdf4d3&url=http%3A//www.advertiser.com&kw=car |
| keyword 2 | http://www.googleadservices.com/pagead/adclick?clickinfo=sdf4d3&url=http%3A//www.advertiser.com&kw=boat |
| keyword 3 | http://www.googleadservices.com/pagead/adclick?clickinfo=sdf4d3&url=http%3A//www.advertiser.com&kw=raft |
| keyword 4 | |
| keyword 5 | |

[<< Back]  [View Reports]

©2004 Google - AdWords Home - Terms and Conditions - Editorial Guidelines - Contact Us

Advertising Performance - Customized Conversion Tracking

Overview ▶ Choose conversion type(s) ▶ Generate & insert conversion code ▶ Review setup & reporting Google lets you track different types of conversions for a more detailed analysis of your conversion statistics. There are many types of conversions that different types of businesses can define — we give you four that should cover the majority of conversions you'll want to track.

To get started, select one or more conversion types and press the Continue button.

Selected conversions will be tracked up to 30 days after your ad has been clicked. [?]

- ☐ Purchase/Sale
  Helps online commerce sites track purchases and sales to determine return on investment (ROI).
- ☐ Lead
  Appropriate for sales organizations tracking how many users requested follow-up calls for more information.
- ☐ Signup
  Designed for sites interested in tracking sign-up statistics for subscriptions or newsletters.
- ☐ Page View
  Helps sites track how many pages a user has viewed or the length of a visit.

[<< Back] [Continue >>]

©2004 Google - AdWords Home - Terms and Conditions - Editorial Guidelines - Contact Us

SYSTEMS AND METHODS FOR DETERMINING USER ACTIONS

RELATED APPLICATIONS

The present application is a continuation of and claims priority to U.S. patent application Ser. No. 10/813,356, entitled "SYSTEMS AND METHODS FOR DETERMINING USER ACTIONS," filed Mar. 31, 2004, which is itself a continuation-in-part of U.S. patent application Ser. No. 10/653,899, entitled "SYSTEMS AND METHODS FOR DETERMINING USER ACTIONS," filed Sep. 4, 2003, the disclosures of each of which is incorporated herein by reference in their entirety.

FIELD OF THE INVENTION

Systems and methods consistent with the principles of the present invention relate generally to determining user actions and, more particularly, to determining user actions associated with advertising.

BACKGROUND OF THE INVENTION

Networks, such as the Internet, have become an increasingly important part of our everyday lives. Millions of people now access the Internet on a daily basis to shop for goods and services and obtain information of interest.

For example, suppose an individual wishes to purchase a printer via the Internet. The individual accesses the Internet and types in a vendor's Internet address. The individual may then browse the vendor's available products to determine whether the vendor has the desired product.

If the individual does not know which vendors sell printers, the individual may access a web site associated with a search engine. The individual may input the generic term "printer" into the search engine to attempt to locate a vendor that sells printers. Using a search engine in this manner to locate individual web sites that offer the desired product or service often results in a list of hundreds or even thousands of "hits," where each hit may correspond to a web page that relates to the search term.

In addition, the search engine may provide advertisements relating to various products or services. For example, when a query associated with printers is received, the search engine may output advertisements from companies that purchase advertising relating to printers, along with the other hits. The search engine provider may charge each company a predetermined fee each time that company's advertisement is displayed to a user. A more recent trend is to charge companies a fee each time their advertisement is selected by a user (i.e., each time a user clicks on the displayed advertisement). Not all clicks, however, result in desired user actions or "conversions." A conversion may be defined by the advertiser and may represent, for example, a purchase, a registration, a page-view, etc.

SUMMARY OF THE INVENTION

In accordance with one aspect consistent with the principles of the invention, a method for tracking user actions is provided. The method may include receiving information in response to a user action, where the information indicates that the user performed a conversion. The method may also include determining whether the conversion resulted from an advertisement provided by a first entity.

According to another aspect, a system including a memory to store instructions and a processor to execute the instructions in the memory is provided. The processor may provide a user interface including an option to track user actions associated with an ad provider that is not affiliated with the system. The processor may also receive a selection from an advertiser and enable tracking of user actions associated with the ad provider.

According to a further aspect, a method for tracking user actions includes receiving an ad selection from a user, generating a cookie in response to the ad selection and transmitting the cookie to the user. The method also includes receiving information in response to a user action, where the information indicates that the user performed a conversion associated with an advertiser. The method further includes determining whether the conversion was associated with an ad.

According to yet another aspect, a system including a memory to store instructions and at least one processor to execute the instructions in the memory is provided. The processor may track users' actions associated with a first ad provider. The processor may also track users' actions associated with a second ad provider, where the first ad provider is not affiliated with the second ad provider.

BRIEF DESCRIPTION OF THE DRAWINGS

The accompanying drawings, which are incorporated in and constitute a part of this specification, illustrate an embodiment of the invention and, together with the description, explain the invention. In the drawings.

FIGS. 8-17 illustrate exemplary user interface screens associated with implementations consistent with the principles of the invention.

DETAILED DESCRIPTION

The following detailed description of implementations consistent with the present invention refers to the accompanying drawings. The same reference numbers in different drawings may identify the same or similar elements. Also, the following detailed description does not limit the invention.

Overview

Systems and methods consistent with the principles of the invention may perform conversion tracking associated with advertisers. The term "conversion," as used herein, may be defined by the advertiser and may represent a particular user action including, for example, a purchase, a registration, a sign-up, a page-view, a download, etc. In implementations consistent with the invention, "internal conversions" and "external conversions" may be tracked. The phrase "internal conversion," as used herein, may refer to, for example, a conversion associated with ads provided by the same entity that performs the conversion tracking. In other words, the same entity performs both the providing of ads and the conversion tracking. The phrase "external conversion," as used herein, may refer to a conversion resulting from ads provided by other entities/networks that are not affiliated with or controlled by the entity that performs the conversion tracking.

Advertisers, therefore, may be able to use a single entity to track conversions across all of the ad providers/networks they use to distribute their ads. Advertisers may also compare conversion information for the same or similar ads provided by a number of different ad providers/networks.

Exemplary Network Configuration

Figure 1:
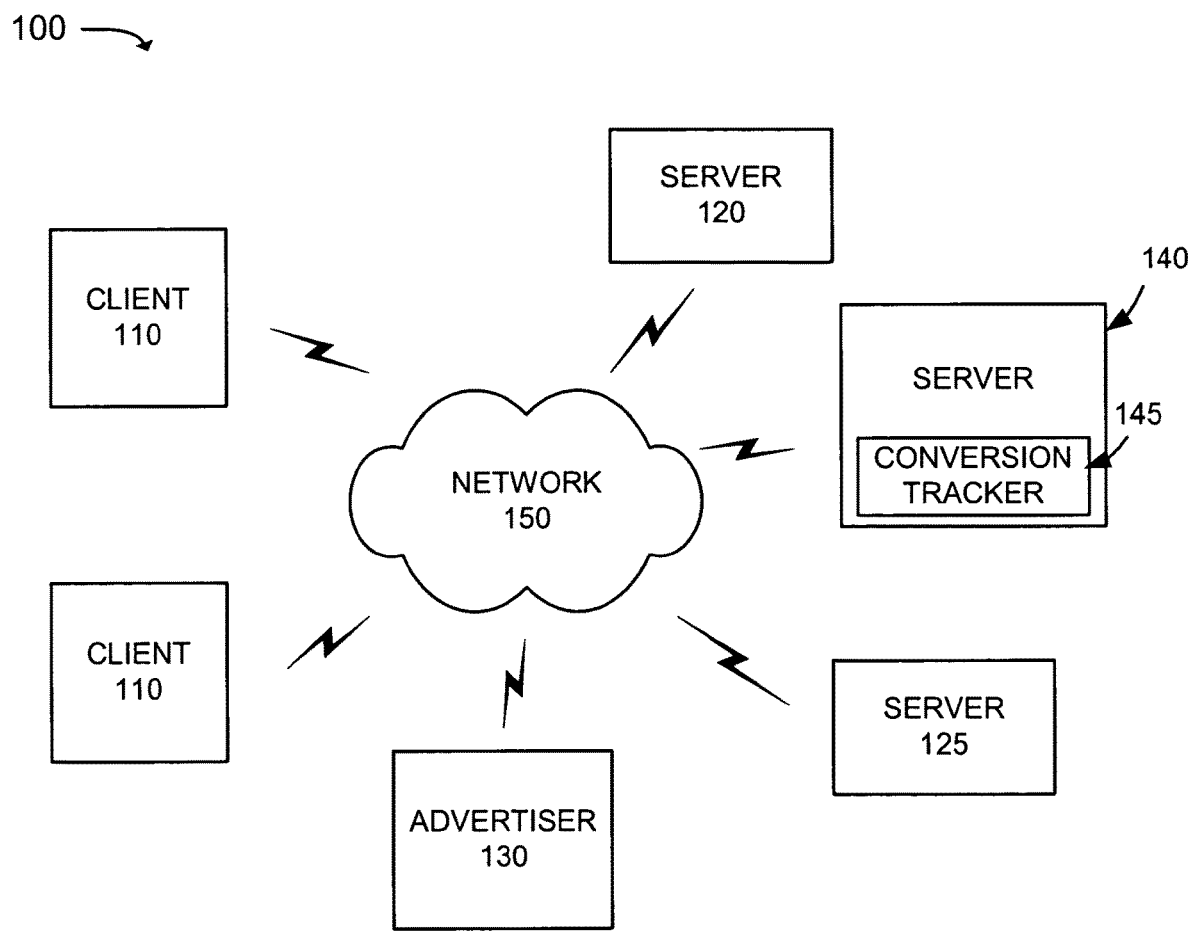
FIG. 1 is an exemplary diagram of a network in which systems and methods consistent with the principles of the invention may be implemented.

FIG. 1 is an exemplary diagram of a network 100 in which systems and methods consistent with the principles of the invention may be implemented. Network 100 may include clients 110, servers 120, 125 and 140 and advertiser 130 connected via network 150. Clients 110, server 120, server 125, advertiser 130 and server 140 may connect to network 150 via wired, wireless, or optical connections. Network 150 may include a local area network (LAN), a wide area network (WAN), a telephone network, such as the Public Switched Telephone Network (PSTN), an intranet, the Internet, a different type of network, or a combination of networks. Two clients 110, one server 120, one advertiser 130 and one server 140 have been illustrated in FIG. 1 for simplicity. In practice, there may be more or fewer clients, servers and advertisers. Also, in some instances, a client may perform the functions of a server and a server may perform the functions of a client. Additionally, in alternative implementations, the functions performed by one server may be combined with the functions performed by another server. For example, server 120 may perform the functions of both servers 120 and 140, or vice versa.

Clients 110 may include devices, such as personal computers, lap top computers, personal digital assistants (PDAs), wireless telephones, etc., threads or processes running on these devices, and/or objects executable by these devices. Servers 120 and 125 may each include one or more server devices, computer processors, threads, and/or objects that operate upon, search, maintain, and/or manage documents in a manner consistent with the principles of the invention. Servers 120 and 125 may be associated with different search engine providers/networks. For example, server 120 may be associated with one search engine provider or network and server 125 may be associated with a different search engine provider or network.

Advertiser 130 may include one or more server devices/platforms that provide information, products and/or services to clients 110. For example, advertiser 130 may represent a vendor that sells goods/services over the Internet. Advertiser 130 may also pay for advertising associated with searches performed by server 120 and/or server 125.

For example, advertiser 130 may pay for advertising associated with one or more keywords relating to server 120. When server 120 receives a search query with the keyword(s), information associated with advertiser 130 may be displayed to the user with the search results. Advertiser 130 may also pay for advertising associated with one or more keywords associated with server 125. In a similar manner, when server 125 receives a search query with the keyword(s), information associated with advertiser 130 may be displayed to the user with the search results. Although the previous examples have been given in the context of search queries, it will be recognized that the present invention is not so limited. As just one example, information associated with advertiser 130 may be provided to clients 110 in association with content (e.g., documents) from server 120 or server 125 when the content is determined to be related to the advertiser associated information, as described in U.S. patent application Ser. No. 10/375,900, entitled "Serving Advertisements Based on Content," filed Feb. 26, 2003, the entire contents of which are expressly incorporated herein by reference.

Server 140, consistent with the present invention, may include one or more server devices, computer processors, threads, and/or objects that track conversion information associated with clients 110 and advertiser 130. In an exemplary implementation consistent with principles of the invention, server 140 may include a conversion tracker 145 that tracks conversions associated with clients 110 accessing information from advertiser 130.

In an exemplary implementation described in detail below, it is assumed that server 120 and server 140 are controlled by the same entity, such as an ad provider. In this example, server 120 represents an "internal" entity or network with respect to server 140 and conversions/ad clicks associated with server 120 represent internal conversions/ad clicks. In the example described below, it is also assumed that server 125 represents an "external" entity or network with respect to server 140. Conversions/ad clicks associated with server 125, therefore, represent external conversions/ad clicks.

Exemplary Server Architecture

Figure 2:
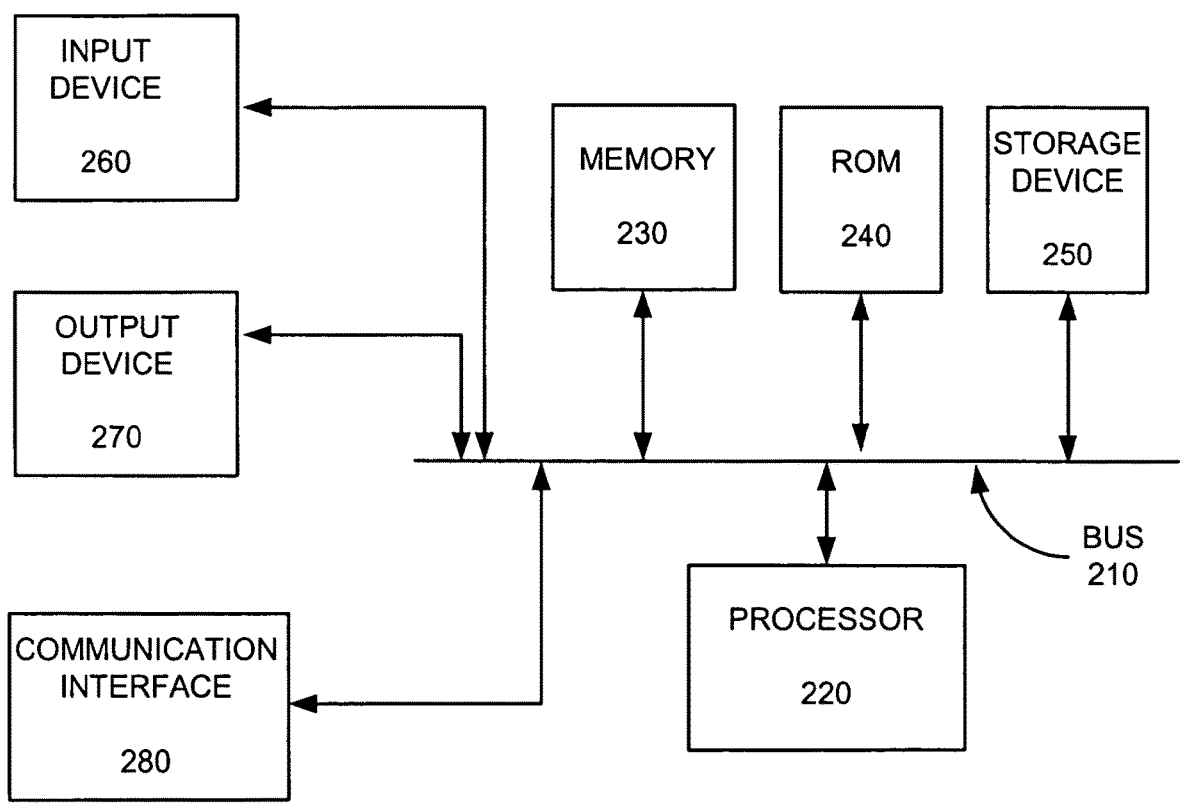
FIG. 2 is an exemplary diagram of a server of FIG. 1 according to an implementation consistent with the principles of the invention.

FIG. 2 is an exemplary diagram of a server of FIG. 1, which may correspond to one or more of servers 120, 125 and 140, according to an implementation consistent with the principles of the invention. Server 120/125/140 may include a bus 210, a processor 220, a main memory 230, a read only memory (ROM) 240, a storage device 250, one or more input devices 260, one or more output devices 270, and a communication interface 280. Bus 210 may include a path that permits communication among the components of server 120/125/140.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device 260 may include one or more conventional mechanisms that permit a user to input information to server 120/125/140, such as a keyboard, a mouse, a pen, voice recognition and/or biometric mechanisms, etc. Output device 270 may include one or more conventional mechanisms that output information to the user, such as a display, a printer, a speaker, etc. Communication interface 280 may include any transceiver-like mechanism that enables server 120/125/140 to communicate with other devices and/or systems. For example, communication interface 280 may include mechanisms for communicating with another device or system via a network, such as network 150.

Servers 120 and 125, consistent with the principles of the invention, may perform searches based on inputs from clients 110. Server 140, consistent with the principles of the invention, may perform conversion tracking associated with clients 110 interacting with servers 120 and 125 and advertiser 130. Servers 120/125/140 may perform these operations in response to processor 220 executing software instructions contained in a computer-readable medium, such as memory 230. A computer-readable medium may be defined as one or more memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

In addition, servers 120, 125 and 140 are each illustrated in FIG. 1 as being single devices. Each of servers 120, 125 and 140 may also be implemented as a network of computer processors and/or servers.

Figure 3:
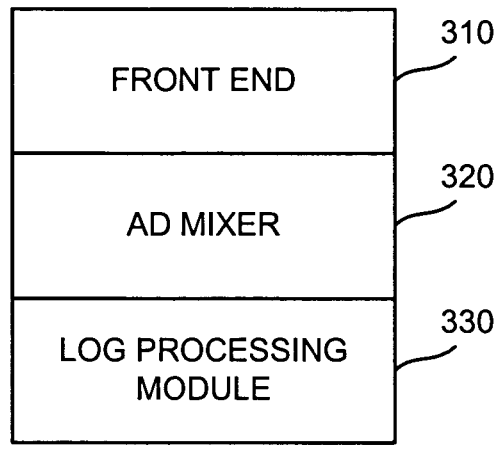
FIG. 3 is an exemplary functional block diagram of a portion of a server of FIG. 1 according to an implementation consistent with the principles of the invention.

FIG. 3 is an exemplary functional block diagram of a portion of server 140 according to an implementation consistent with the principles of the invention. The logical blocks illustrated in FIG. 3 may be implemented in software, hardware, or a combination of hardware and software. In addition, each of the functional blocks may represent one or more computer processors, threads, and/or objects that track and process user actions and generate conversion related information.

Conversion tracker 145 may be implemented in server 140 and may include a front end (FE) 310, an ad mixer 320 and a log processing module 330. FE 310 acts as the front end of conversion tracker 145 to receive information associated with conversion tracking, such as ad click information, and generate cookies, as described in more detail below. For example, FE 310 may set and parse hypertext transfer protocol (HTTP) cookies associated with tracking user actions. Ad mixer 320 may receive ad click information and return information regarding the ad click to FE 310. Log processing module 330 may analyze ad click and conversion information and generate reports based on this information. It should also be understood that in alternative implementations, the functions performed by one of the logical blocks in FIG. 3 may be performed by another logical block. Further, in alternative implementations, a single logical block/processing device may perform the functions of conversion tracker 145.

Exemplary Processing

Figure 4:
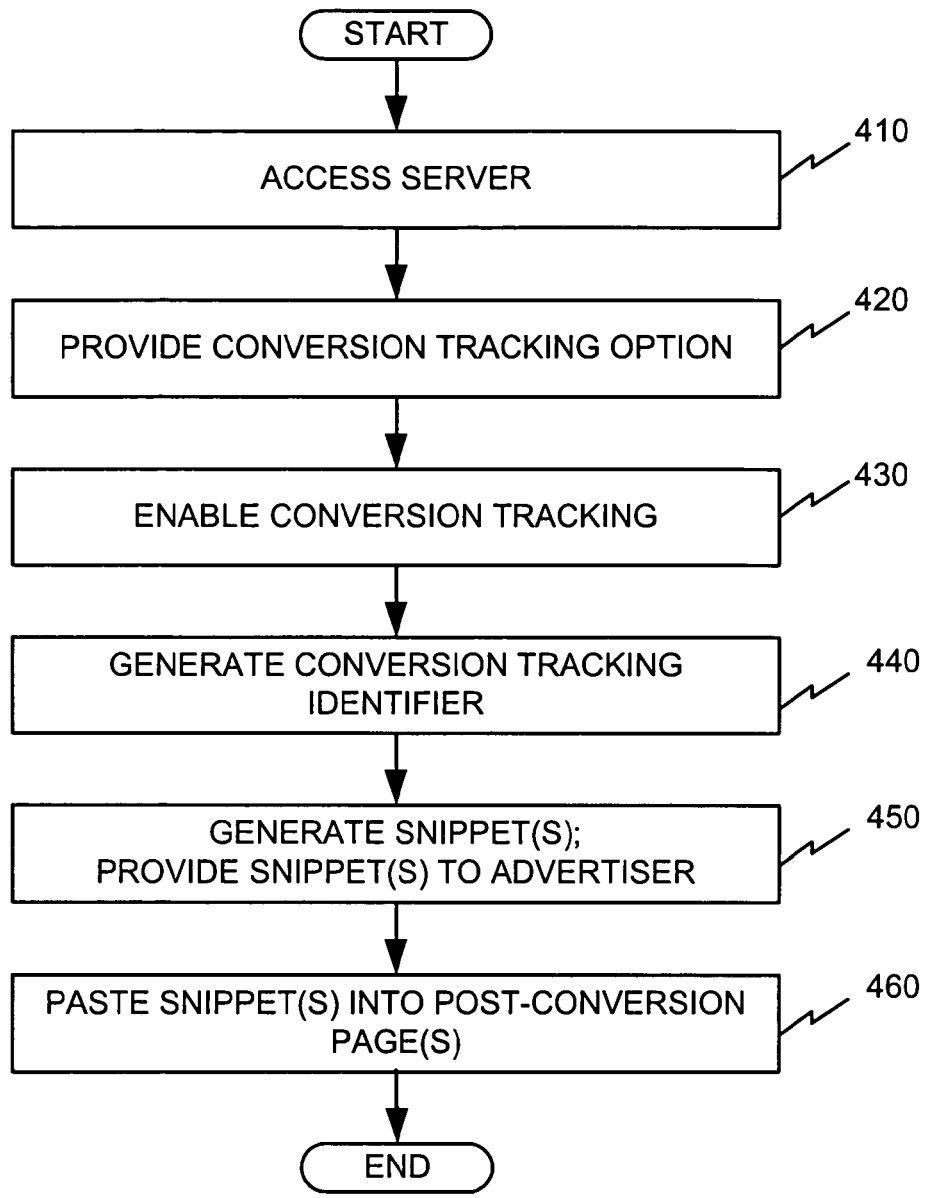
FIG. 4 is a flow diagram illustrating exemplary processing associated with enabling conversion tracking according to an implementation consistent with the principles of the invention.

FIG. 4 is an exemplary flow diagram illustrating processing associated with enabling conversion tracking according to an implementation consistent with the principles of the invention. The following description focuses on one or more servers that provide searching functions and paid advertisements. It will be appreciated that the techniques described herein are equally applicable to any server(s) that may provide advertisements for which fees are charged when the advertisements are selected by or presented to a user of a client device, such as client 110 in FIG. 1, and indeed to any system in which particular user actions are to be determined. For example, the techniques described herein are applicable to identifying user actions with respect to traditional banner advertisements, advertisements targeted based on the content or concepts in a document or page being provided to users, etc.

Processing may begin by an advertiser accessing server 120 (act 410). For example, advertiser 130 may connect to server 120 via network 150 by entering a uniform resource locator (URL) in a browser being executed by advertiser 130. Alternatively, an entity associated with advertiser 130 may connect to server 120 via a processing device/computer executing a conventional web browser. Server 120 may provide a user interface (UI) that includes a selection for advertisers that purchase advertising related to keywords that may be input to the search engine executed by server 120. For example, as discussed above, advertiser 130 may represent an existing advertiser who has purchased one or more words/terms associated with computer queries/searches. Purchasing these words/terms may enable advertiser 130 to be featured when a search query entered by a user includes those words/terms. For example, advertiser 130 may be featured by an ad (whether in the form of a banner ad, text ad, pop-up or pop-under window, etc.) on a web page displayed to a client 110.

Assume that advertiser 130 clicks on (i.e., selects) the advertiser option. Server 120 may then provide a UI that includes a button/box that may be clicked or selected to enable conversion tracking for that advertiser (act 420). The conversion tracking option may allow an advertiser to individually enable conversion tracking for each account that the particular advertiser controls. For example, advertiser 130 may control multiple accounts. In this case, advertiser 130 may wish to enable conversion tracking for one or more of the accounts. Assume that advertiser 130 has a single account and enables conversion tracking for that account (act 430). When conversion tracking is enabled, server 140 will be able to track conversion rates with respect to ad clicks, ad impressions and other information, as described in more detail below. The term "ad impression" as used herein generally refers to the display of an advertisement to a client 110.

After conversion tracking is enabled, server 120 may generate a conversion tracking identifier (ID) associated with each account that has been selected for conversion tracking (act 440). The particular conversion tracking ID may be unique for each particular account. In the example above in which advertiser 130 enabled conversion tracking for a single account, server 120 may generate a single conversion tracking ID. In some implementations, the conversion tracking ID may correspond to advertiser 130's account ID. This conversion tracking ID enables server 120 to maintain privacy with respect to clients 110. For example, in implementations consistent with the principles of the invention, the conversion tracking ID is included in a cookie path associated with tracking ad clicks, as described in more detail below. This may limit the number of cookies being transmitted, thereby reducing privacy concerns associated with some users. In other implementations, a single conversion tracking ID may be used for all advertisers that have enabled conversion tracking or no conversion tracking ID may be used.

It should be noted that the conversion tracking ID may not affect the level of granularity at which reports may be generated. For example, even if a single conversion tracking ID was used for all advertisers in the system, server 140 may still associate the ad click data with specific advertisers, campaigns, creatives, etc. This is because the cookies may include additional information regarding the ad clicks, such as advertiser specific information.

After conversion tracking is enabled and a conversion tracking ID has been assigned, server 120 generates a snippet, e.g., a piece of software code, that may be provided to advertiser 130 (act 450). In an exemplary implementation consistent with the present invention, the snippet may be a piece of hypertext markup language/JavaScript (HTML/JS) code that allows clients 110 and/or advertiser 130 to pass information to server 140, such as the value of a conversion and a label describing the type of conversion (e.g., a purchase, a registration, a page view, a download, etc.), after a conversion has occurred. In an exemplary implementation consistent with the present invention, the snippet may be an image request that is transmitted to server 140 after a conversion has occurred. Alternatively, the snippet may be a text request. An example of such an HTML snippet may be as follows:

<img src="http://www.googleadservices.com/pagead/conversion/GHSnx87543x/conversion?value=123&label="Purchase"&format=120×60>

In this example, "googleadservices.com" represents server 140 and GHSnx87543x represents the conversion tracking ID assigned to the conversion tracking enabled account associated with advertiser 130. The conversion tracking ID included in the snippet may be used to determine whether client 110 will send a cookie to server 140 after a conversion occurs, as described in more detail below. "Value" and "label" may represent optional parameters that can be dynamically generated and appended to the HTML image request. The value parameter may represent an advertiser defined unit or value associated with a conversion specified in any units (e.g., dollars). If a particular advertiser has the same unit or value for each conversion, server 120 may include the actual unit/value in the snippet. For example, if each conversion is worth $10 to advertiser 130, the value field may specify the value of ten dollars. The label parameter may be a free form text label that can be assigned to differentiate types of conversions that may be used in a final report (e.g., "purchase," "registration," "mailing list signup," "page view," "download," etc.). The set of available labels may be predefined and any requests not included within the predefined list may be marked as an Unknown-LabelType. The label parameter may also be set dynamically, per page, to advertiser specific custom labels. The format parameter defines the size of the post conversion page image that will be returned to advertiser 130 when a conversion is achieved, as described in more detail below.

Server 120 may also provide a JS wrapper and instructions to advertiser 130 that facilitate setting the value and label parameters and pasting the snippet into the appropriate page. For example, server 120 may provide a number of snippets that may be pasted into a number of advertiser pages. The JS wrapper may facilitate setting the values and labels in each snippet based on the particular item/product associated with the conversion. For example, if advertiser 130 sells only three products having prices of $50, $100 and $200, server 120 may provide three snippets and advertiser 130 may set the value in each snippet to the values $50, $100 and $200, respectively. Alternatively, server 120 may set the values in each snippet and also include the appropriate label for each snippet.

After server 120 provides advertiser 130 with the HTML/JS snippet(s), along with instructions associated with the snippet, advertiser 130 may paste the snippet(s) in the appropriate post conversion page(s) on advertiser 130's web site (act 460). As described previously, each advertiser may define what acts are considered conversions. When a client 110 performs such a predefined act, a conversion has taken place. For example, a purchase, a registration, a page view, a sign-up, a download, etc., may be considered a conversion. In each case, a post-conversion page provided by advertiser 130 may be displayed to client 110. For example, in the case of a purchase, advertiser 130 may provide a web page to client 110 after client 110 has transmitted a credit card number to advertiser 130 for purchasing a particular product. When advertiser 130 receives the credit card information, the purchase has been completed and advertiser 130 may provide a page that states "Your purchase has been completed. Your total charges are X." Such a page may represent a post-conversion page.

After advertiser 130 pastes the HTML/JS snippet(s) into the appropriate post conversion page(s), conversion tracking is enabled for advertiser 130. The process for conversion tracking may then commence in a manner that is transparent with respect to advertiser 130.

Figure 5:
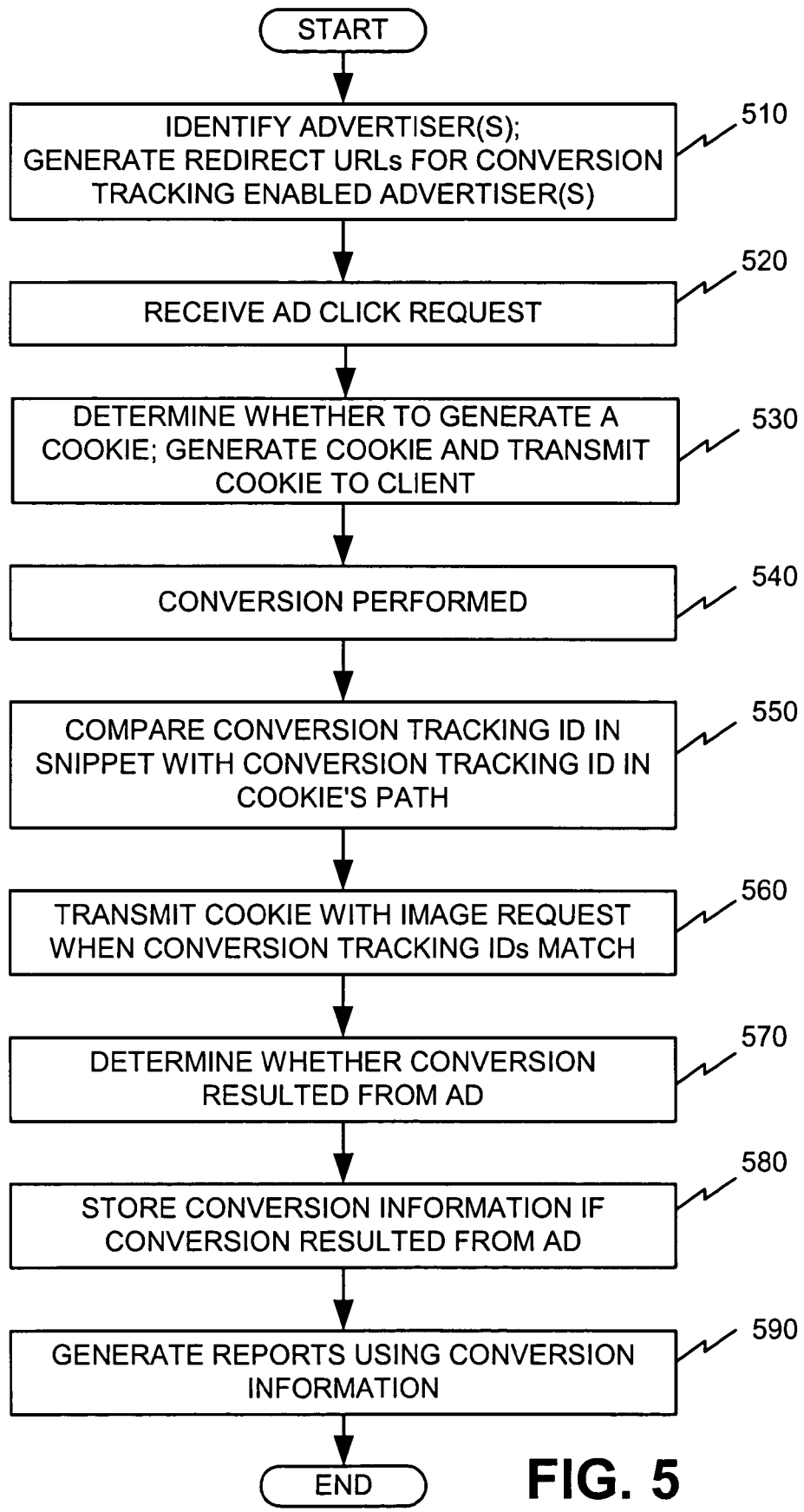
FIG. 5 is a flow diagram illustrating exemplary processing associated with conversion tracking according to an implementation consistent with the principles of the invention.

FIG. 5 is a flow diagram illustrating exemplary processing associated with conversion tracking according to an implementation consistent with the principles of the invention. The processing described below uses the example of conversion tracking associated with ads based on search queries. However, as discussed above, the techniques described herein may be used in any system in which particular user actions are to be determined/identified. Processing may begin with a client 110 accessing server 120 via network 150 and receiving a UI for entering a search query. Assume that the user enters a search query and transmits the search query to server 120. Server 120 receives the search query, executes the search and generates a list of search results.

Server 120 may also identify advertiser(s) based on the search query (act 510). For example, server 120 may store advertiser information in a memory, such as storage device 250 (FIG. 2). The advertiser information may include a database of keywords and corresponding advertisers (along with their URLs) who have purchased advertising associated with the keywords. When server 120 receives a query, server 120 searches the advertiser information to determine whether any advertiser has purchased advertising associated with one or more terms in the input query. Server 120 may then identify the advertiser(s) associated with the input query and the particular web site(s) associated with the respective advertiser(s). In one implementation, server 120 may also generate a redirect URL for each identified advertiser that has enabled conversion tracking so that the URL points to server 140 (act 510). For example, server 120 may generate a redirect URL associated with a conversion tracking enabled advertiser, such as:
http://www.googleadservices.com/pagead/adclick?adurl=http://www.advertiser.com/landingpage&sa=1

This redirect URL may point to googleadservices.com, which in this example, corresponds to server 140, and may indicate that the redirect is associated with an ad click on a page ad. The redirect URL may also point to the advertiser's landing page or home page (i.e., advertiser.com/landingpage). The presence of sa=1 in the exemplary URL above may be used by log processing module 330 to recognize this URL is associated with an ad click. Other information may also be included in the redirect URL.

After generating the redirect URL(s) for each conversion tracking enabled advertiser associated with the search query, server 120 transmits the search results and advertisement(s) to client 110 for output (e.g., visual display). Assume that a user, via client 110, performs an ad click on an ad associated with a conversion tracking enabled advertiser displayed on client 110. For example, assume that a web site associated with advertiser 130 is provided on the web page displayed on client 110 and that advertiser 130 has enabled conversion tracking. Further assume that the user, via client 110, clicks on the displayed ad associated with advertiser 130.

After client 110 selects the ad associated with advertiser 130, an ad click request is sent to server 140 as a result of the redirect URL generated at act 510 (act 520). For example, server 140 may receive an ad click HTTP request, such as:
http://www.googleadservices.com/pagead/adclick?url=http://www.advertiser.com/landingpage&sa=1

As discussed above, the redirect URL points to googleadservices.com, which in this example, corresponds to server 140. Conversion tracker 145 in server 140 receives the ad click request and directs client 110 to advertiser's 130 home page or landing page, which in this example may be http://www.advertiser.com/landing page. In an exemplary implementation, FE 310 may also store or log the ad click request and forward the ad click request to ad mixer 320. In some implementations consistent with the present invention, FE 310 may also redirect the request back to itself by, for example, rewriting sa=1 to sa=L. This may ensure that clicks by web crawlers are not counted in the number of ad clicks associated with an advertiser. For example, automated crawling software that does not follow HTTP redirects will never make a request for the URL where the field sa=1 has been rewritten to sa=L. This prevents spamming by automated crawlers that lack this redirect following feature.

Ad mixer 320 receives the ad click request and may log the ad click request. Ad mixer 320 and/or FE 310, may also analyze the ad click request to determine whether a cookie should be generated in response to the ad click (act 530). For example, cookies may be set for conversion tracking enabled advertisers. In the example above, since conversion tracking is enabled for advertiser 130, ad mixer 320 and/or FE 310 may determine that a cookie should be set. Ad mixer 320 may also identify the conversion tracking ID associated with advertiser 130, which will be included in the cookie path. In an exemplary implementation consistent with present invention, including the conversion tracking ID in the cookie path limits the number of cookies that will be sent to server 140, as described in more detail below.

Ad mixer 320 may further identify the approximate time that the ad click occurred and generate an ad click time stamp (TS). The TS may be a globally unique identifier that includes the time that ad mixer 320 received the ad click request. The TS may also include other information, such as server IP address/host processor ID, etc., to ensure that the TS is globally unique. Ad mixer 320 may then generate a message including the TS, a conversion tracking ID and a Boolean indicating whether a cookie should be set. If the ad click was not associated with a conversion tracking enabled advertiser, the Boolean will indicate that no cookie should be generated. Ad mixer 320 may forward this message to FE 310.

FE 310 receives the message from ad mixer 320 and determines whether a cookie is to be set. The cookie may represent a conversion tracking cookie associated with tracking conversions for an advertiser. Assume that the information from ad mixer 320 indicates that a cookie is to be set, FE 310 may then generate the conversion tracking cookie (act 530). In an exemplary implementation, the conversion tracking cookie may also include a click string (CS). The CS may represent the particular ad click(s) or action(s) performed by the user and may be used to track the user's actions. The conversion tracking cookie may also include the ad click TS and/or an expiration date associated with the cookie. The conversion tracking cookie's path may also include the conversion tracking ID of the conversion tracking enabled advertiser. FE 310 may send the cookie to client 110 along with the redirect URL pointing to advertiser 130's site (act 530). For example, server 140 may send an HTTP message to client 110 that includes the following information:
Set-Cookie: CONVERSION=CS=A6yIzdSDw-4-iX8pj0IqkRPRxTzfA1Kp6FA5xKXgACApTBAsmMEA BCgpF:TS=1055812564745609; path=/pagead/conversion/GHSnx87543/; domain=.googleadservices.com; expires=Tue, 17 Jun. 2003 01:02:03 GMT In the example above, the message indicates that a cookie identified as CONVERSION is to be set and that the cookie includes a CS. The message also includes a TS and an expiration date associated with the cookie. For example, the cookie may be set to expire 30 days from the time the cookie was created. This prevents old cookies from being used to incorrectly identify later conversions. Shorter or longer cookie expiration periods may also be used. In other implementations, the cookie may just include the TS identifying when the cookie was created. In this case, server 140 may determine whether the cookie has expired based on the TS. In still other implementations, the cookie may not include an expiration date. In further implementations, the cookie may be a session cookie that may expire when the client's 110 browser closes. In further implementations, client 110 may automatically delete the cookie after a predetermined period of time.

The exemplary message above also includes a path for the cookie and a domain. The domain, googleadservices.com, corresponds to server 140 in this example. The cookie path in the example above is: pagead/conversion/GHSnx87543/. The field GHSnx87543 in the cookie path may represent the conversion tracking ID for advertiser 130. By including the conversion tracking ID in the cookie path, this cookie will not be forwarded to server 140 when ad clicks associated with other advertisers are performed. For example, in one implementation consistent with the present invention, client 110 will only send a cookie associated with a particular advertiser when client 110 performs what that particular conversion tracking enabled advertiser pre-defined to be a conversion, as described in more detail below. When client 110 clicks on impressions or performs conversions not associated with advertisers that have not enabled conversion tracking, no cookies will be sent by client 110. Reducing the number of times cookies are sent reduces the ability of server 140 to track user actions. This may reduce privacy concerns of privacy sensitive users. In other implementations consistent with the present invention in which privacy concerns are not as great, client 110 may send cookies associated with conversion tracking enabled advertisers when no conversions for those advertisers have occurred. In this manner, server 140 may identify more actions performed by users.

Client 110 receives the message indicating that the cookie is to be set and redirect URL from server 140. Client 110 may store the cookie and use the redirect URL to access advertiser 130's web site. Thereafter, additional user actions (e.g., conversions) associated with advertiser 130 may be transmitted to server 140 via the cookie.

Assume that client 110 performs an act defined by advertiser 130 to be a conversion for that particular advertiser (act 540). In this case, when client 110 performs the conversion, advertiser 130 downloads a post conversion page to client 110. As discussed above with respect to FIG. 4, the post conversion page includes the snippet (e.g., an HTML image request) provided to advertiser 130. As discussed above, in one implementation, the snippet may include an image request. In other implementations, the snippet may include a text request. Advertiser 130 downloads the post conversion page to client 110. When client 110 receives and displays the post conversion page, client 110 executes the snippet. The snippet, as described previously with respect to FIG. 4, may include a conversion tracking ID associated with advertiser 130. Assuming that the snippet include an image request, when the snippet is executed, client 110 sends the image request to server 140. That is, client 110 executes the snippet and sends a post conversion image request to server 140. For example, the post conversion HTTP image request may include the following information:
http://www.googleadservices.com/pagead/conversion/ GHSnx87543x/?value=123&
label=Purchase&format=120×60.

This image request includes information indicating that a conversion occurred, the conversion tracking ID, a value, a label and a format for the image.

Client 110 may also compare the conversion tracking ID included in the snippet (GHSnx87543x in this example) with the conversion tracking ID in the stored cookie's path (act 550). That is, client 110 compares the conversion tracking ID included in the snippet on advertiser 130's post conversion page with the conversion tracking ID associated with the cookie received at act 530. When the conversion tracking IDs match, client 110 transmits the cookie, along with the post conversion image request, to server 140 (act 560). It should be understood that client 110 may receive a number of cookies from server 140 when client 110 performs ad clicks associated with various conversion tracking enabled advertisers in a manner similar to that discussed above with respect to advertiser 130. Therefore, client 110 may compare the conversion tracking ID in the post conversion snippet with the conversion tracking IDs included in the cookie path for each of the cookies stored on client 110. When the conversion tracking ID in the snippet matches any one of the conversion tracking IDs in a cookie path of a stored cookie, the client 110 will send that cookie to server 140. In some implementations consistent with the present invention, client 110 may also examine the TS, if a TS is included in the cookie, to determine whether to send the cookie to server 140. For example, if client 110 determines that the cookie has expired, client 110 may not send the cookie. Server 140, however, may also look at the TS, as described below.

Assuming that the conversion tracking 1D in the snippet matches the cookie associated with advertiser 130 (and optionally, the TS indicates that the cookie has not expired), client 110 sends the cookie for advertiser 130 and the post conversion image request to server 140. When server 140 receives the image request, conversion tracker 145 examines the request and determines whether the conversion resulted from a paid advertisement (act 570). For example, server 140 may look to see whether the cookie with the unique conversion tracking ID associated with advertiser 130 has been received with (or in close time proximity to) the image request. The cookie may also include the CS as part of the cookie payload and the CS may identify the particular ad click(s) and/or action(s) performed by client 110. The cookie may also contain other data that may be used to correlate the click event with the conversion, e.g., when the click happened, the ad that was clicked on, etc.

If conversion tracker 145 does not find such a cookie included with the image request, FE 310 may determine that the conversion did not result from a paid advertisement. If FE 310 has received such a cookie with the image request, FE 310 may determine whether the cookie has expired based on the expiration date or TS information included with the cookie. Server 140 may store information associated with the conversion, such as the value, type, etc. (act 580). FE 310 may also return an image to client 110 that states, for example, "Thank you for shopping at a Google advertiser." Client 110 may then paste this image into the post conversion page displayed on client 110. Providing this image in the post conversion page allows clients 110 to be aware that some of their actions are being tracked. If FE 310 determines that the conversion did not result from a paid ad or that the cookie associated with the paid ad had expired, server 140 may not store the conversion information. Server 140 may also return a blank image or no image and client 110 will not receive any additional message on the post conversion page.

FE 310 may also log the received image request into a log, such as a binary formatted log. FE 310 may further send a message to ad mixer 320 indicating that the conversion occurred. Ad mixer 320 may also log the conversion event in an ad conversion log. The ad conversion log may include records, such as, a number of conversion events, a value associated with each conversion event, a label associated with each conversion event, a time associated with each conversion event, the search engine or ad network associated with each conversion event, etc. Log processing module 330 may access the ad conversion log and use the ad conversion data to populate a conversion events database. Log processing module 330 may then generate reports based on information in the conversion events database (act 590).

For example, log processing module 330 may generate a conversion ratio for a particular advertiser, such as advertiser 130. The conversion ratio may be based on the number of times a displayed ad associated with an advertiser 130 was clicked at least once divided by the number of conversions that resulted from the ad. By generating the conversion ratio, both advertisers and search engine providers may determine the effectiveness of the paid ads.

More detailed analysis of advertisements can also be made. For example, log processing module 330 may determine a total value of all conversions over a period of time for a particular advertiser that resulted from ads, a value per click, etc. Log processing module 330 may also determine a conversion ratio based on where the ad is displayed. That is, server 140 may store information indicating whether the paid ad was displayed at the top of a web page, as opposed to another location, such as the side of the web page, or the position of the ad in a ranked list. Log processing module 330 may then analyze a conversion ratio with respect to the location of the displayed ad.

Cross Network Conversion Tracking

As described above, conversion tracker 145 may track conversions associated with advertising purchased by advertiser 130. In the example described above, it is assumed that conversion tracker 145 is associated with and/or controlled by the same entity that controls server 120. For example, server 120 may represent a search engine provider that performs computer searches and provides ads along with the search results and conversion tracker 145 may be controlled or owned by the same entity as the search engine executed by server 120. This enables conversion tracker 145 to track internal conversions/ad clicks.

Conversion tracker 145, as described briefly above, may also be used to track conversions associated with other entities/networks. For example, conversion tracker 145 may be used to track external conversions/clicks. For example, in one implementation, servers 120 and 125 may be associated with competing search engine providers and server 125 may represent an external entity with respect to server 120 and conversion tracker 145. Therefore, conversion tracker 145 may be able to track conversions for any number of ad providers/networks, regardless of whether the networks are directly affiliated or controlled by the entity performing the conversion tracking. This enables conversion tracker 145 to be able to compare conversions and conversion ratios across different ad providers/networks.

The processing performed by conversion tracker 145 with respect to tracking external conversions may differ from the processing associated with tracking internal conversions. For example, many pieces of information associated with internal clicks (e.g., clicks associated with ads provided by server 120) may not exist for external clicks, such as various click strings, delivery periods, etc. However, conversion tracker 145 may still track conversions and include relevant information for reports to the advertisers, as described in more detail below.

Figure 6:
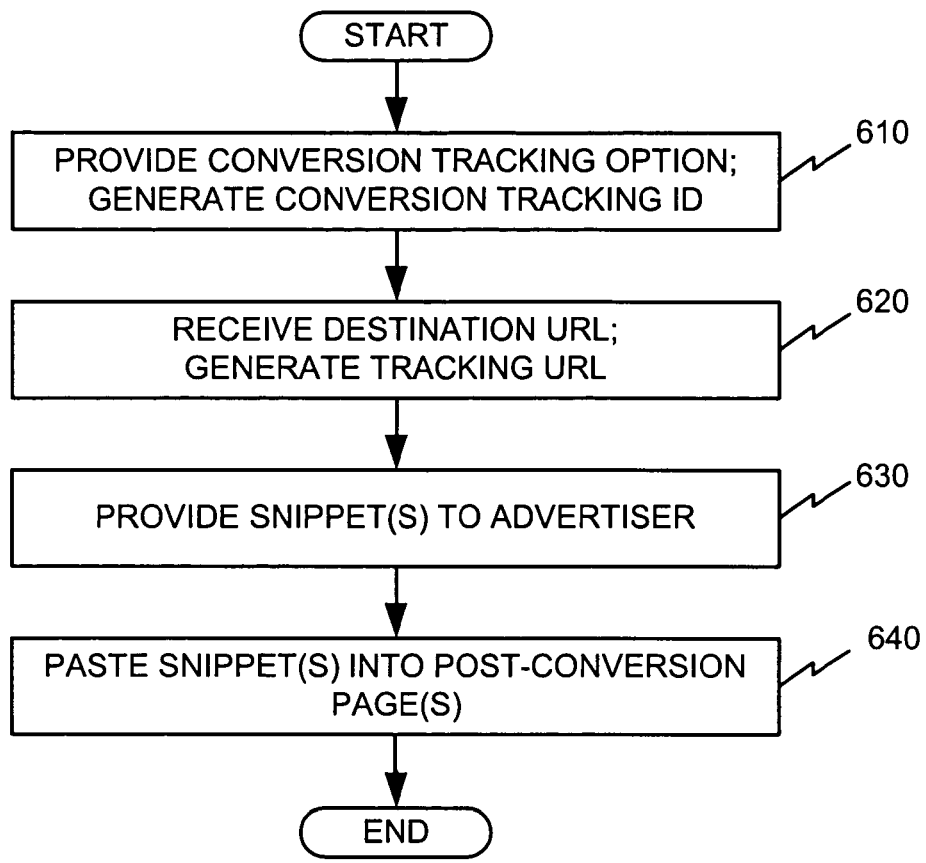
FIG. 6 flow diagram illustrating exemplary processing for enabling external conversion tracking according to an implementation consistent with the principles of the invention.

FIG. 6 is a flow diagram illustrating exemplary processing for enabling external conversion tracking according to an implementation consistent with the principles of the invention. Similar to the discussion above with respect to FIG. 4, the following description focuses on one or more servers that provide searching functions and paid advertisements. It will be appreciated that the techniques described herein are equally applicable to any server(s) that may provide ads for which fees are charged when the ads are selected by or presented to a user of a client device, such as client 110 in FIG. 1, and indeed to any system in which particular user actions are to be determined. For example, the techniques described herein are applicable to identifying user actions with respect to traditional banner ads, ads targeted based on the content or concepts in a document or page being provided to users, etc.

Processing may begin by an advertiser, such as advertiser 130, accessing server 120. For example, advertiser 130 or an entity associated with advertiser 130 may connect to server 120 via network 150 by entering an address associated with server 120. Assume that advertiser 130 has purchased advertising related to keywords that may be provided to the search engine executed by server 125. For example, similar to the discussion above with respect to server 120, advertiser 130 may have purchased one or more words/terms associated with computer queries/searches performed by server 125. Purchasing these words/terms may enable advertiser 130 to be featured when a search query entered by a user into a search engine executed by server 125 includes those words/terms. For example, advertiser 130 may be featured by an ad (whether in the form of a banner ad, text ad, pop-up or pop-under window, etc.) on a web page provided by server 125 for display to a client 110.

Further assume that advertiser 130 would like to enable conversion tracking for the ads provided by server 125 to various clients 110. For example, advertiser 130 may wish to track conversion rates with respect to ad clicks, ad impressions and other information provided by server 125 to clients 110. Similar to the discussion above with respect to FIG. 4, a conversion tracking option may be provided to advertiser 130 (act 610). For example, server 120 may include a conversion tracking user interface (UI) that may be provided to advertiser 130. The conversion tracking UI may include an "External Network," link/icon. The External Network link/icon may include text that indicates that selecting this link/icon indicates that advertiser 130 would like to track conversions on an external network.

Assume that advertiser 130 selects the External Network link/icon. Server 120 may then provide a list of networks from which advertiser 130 can choose. For example, the list of networks may correspond to networks from which advertiser 130 would most likely purchase advertising, such as other search engine providers. The list may also include an "Other" selection in which advertiser 130 can enter the appropriate information, such as a name or domain name, regarding the particular network(s) on which conversion tracking is desired.

If necessary, a conversion tracking ID for advertiser 130 may then be generated (act 610). For example, advertiser 130 may also purchase ads for searches performed via server 120. If advertiser 130 has enabled conversion tracking for internal ads (i.e., ads provided by server 120), advertiser 130 already has a conversion tracking ID, as described above with respect to FIG. 4. In this case, that same conversion tracking ID may be used to track external conversions.

Alternatively, if advertiser 130 has not already been assigned a conversion tracking ID, server 120 may generate a conversion tracking ID for advertiser 130 in a similar manner as that described above with respect to FIG. 4. As discussed above, the conversion tracking ID may not affect the level of granularity at which reports may be generated. For example, even if a single conversion tracking ID is used for all advertisers in the system, conversion tracker 145 may still associate the ad click data with specific advertisers, campaigns, creatives, etc., since the cookies received from clients 110 may include additional information regarding the ad clicks, as described in more detail below.

Server 120 may assign an ad group ID to a particular ad or ad campaign associated with the external advertisements of advertiser 130. Server 120 may also provide a UI to allow advertiser 130 to provide or edit data corresponding to the particular ad or ad creative assigned to a particular ad group. The term "ad creative" as used herein refers to the actual advertisement output to clients 110 along with the search results. The ad creative may include text associated with the ad and a URL hyperlink to a web page of the advertiser. The UI provided by server 120 may allow advertiser 130 to provide keywords associated with an ad creative, a cost-per-click (CPC) value, etc. The UI may also request that advertiser 130 provide a destination URL for a particular ad.

The destination URL may represent a particular web page, also referred to herein as a landing page, that advertiser 130 would like displayed when a particular ad is selected. For example, suppose that advertiser 130 wants to display a particular document, such as a web page, when an ad is selected. In this case, advertiser 130 may embed a URL in the ad, such as http://www.smartadvertiser.com, representing the desired landing page associated with the ad. In this example, when the ad is selected by client 110, client 110's browser is redirected to www.smartadvertiser.com. Therefore, in this example, the destination URL, www.smart advertiser.com, may be provided (act 620). Advertiser 130 may enter this destination URL in the UI and transmit the information to server 120.

Assume that advertiser 130 has selected a particular external network or provided the appropriate information to enable conversion tracking for the external network. Further assume that advertiser 130 has provided the destination URL and other pertinent information via the UI. A tracking URL may then be generated (act 620). The tracking URL may point to server 140 and include the destination URL provided by advertiser 130. For instance, in the example above, server 120 may generate the following tracking URL: http://www.googleadverservices.com/pagead/adclick?clickinfo=<Base64EncodedData>& url=http %3A// www.smartadvertiser.com.

Alternatively, server 120 may instruct advertiser 130 to change the destination URL in its ad to point to server 140 (e.g., include googleadservices.com in the header of the destination URL). In either case, the tracking URL includes the address corresponding to conversion tracker 145 (i.e., www.googleadservices.com. in this example). The tracking URL may also include a click information field and the destination URL (i.e., www.smartadvertiser.com, in this example).

After the tracking URL is generated, server 120 may instruct advertiser 130 to change the destination URL in its ad to the tracking URL. This may involve advertiser 130 modifying information provided to other entities, such as the entity executing the search engine on server 125. This ensures that the other entities will provide the tracking URL when providing an ad for output to a client 110. In this manner, when the ad is subsequently clicked by a client 110, the tracking URL forwards the ad click to server 140, as described in more detail below.

Server 120 and conversion tracker 145, consistent with principles of the invention, may also support dynamic tracking URLs with network-specific syntax and keyword expansion. For example, if advertiser 130 provides a destination URL for an ad on server 120, such as: http://mysite.com/myarg={KEYWORD}, server 120 may substitute the keyword field with the keywords provided for each targeting criteria. For instance, if the actual search term input by client 110 is "car," the resulting URL that client 110's browser goes to would be: http://mysite.com/myarg=car. In other words, the actual search term gets substituted for the KEYWORD field.

In a similar manner, server 120 may also store various auto-expansion features, such as keyword expansion, for a number of commonly used external ad providers/networks. Server 120 may place the known auto-expansion information in the tracking URLs, which will be provided to the advertisers. The external networks supporting auto-expansion will then perform their particular auto-expansion in a similar manner as discussed above with respect to server 120. In the case that the particular network selected via the conversion tracking UI is "Other," server 120 may generate a static tracking URL, since server 120 may not be aware of the particular auto-expansion features these "Other" networks support.

To further illustrate the use of keyword expansion, suppose that a pay per click (PPC) network supports keyword expansion by substituting $KEYWORD with the actual search words that resulted in the displaying of the ad. In this example, assume that advertiser 130 accesses server 120, selects external conversion tracking and provides information for a new creative for external conversion tracking. Further assume that advertiser 130 chooses "PPC Network 1" from a list of networks and provides a destination URL, such as: http://www.advertiser.com/snakeoil. Assume that PPC Network 1 supports automatic keyword expansion and PPC expansion with a particular syntax known by server 120. Server 120 may then generate the following tracking URL:
http://www.googleadservices.com/pagead/adclick?clickinfo=<base64EncodedData>& kw=$KEYWORD&cpc=$CPC&url=http %3A//www.advertiser.com/snakeoil, where "kw" represents the keyword field and "cpc" represents the cost per click field.

If the destination URL provided by advertiser 130 includes $KEYWORD, server 120 recognizes that advertiser 130 would like to receive the click-specific keywords with the conversion information. In this case, server 120 ensures that the particular ad network variables, such as the kw field and the cpc field are included in the tracking URL. This allows the external ad server (e.g., server 125) to expand the variable in the "kw=" parameter and in the "url=" parameter that will become the actual redirect URL to which clients 110 are directed. If the particular ad network does not allow multiple expansions of the same variable in the same URL, server 120 may perform the expansion into advertiser 130's redirect URL. This expansion may be performed on a per-network basis.

The tracking URL, whether dynamic or static, enables conversion tracker 145 to track conversions on external networks, as described in more detail below. The tracking URL, as described above, may include a click information field field, a keyword field, a cpc field and a URL field. The click information field may include click-related information, such as an ad group ID and information that may be used by conversion tracker 145 to identify the particular ad. The ad group ID, as described above, may be unique for each advertiser 130 or advertiser campaign. The keyword field may include optional keywords that are matched with a query. The keywords may be used to display clicks and conversions based on the keyword(s). The CPC field may include optional cost per click information provided by the ad network. Alternatively, the CPC field may include a static advertiser specified CPC, such as an average CPC value. This CPC value may be provided to advertiser 130 via a report, as described in more detail below. The URL field may include the destination URL associated with advertiser 130, such as the page to which client 110 is redirected when the user selects the ad. This URL, as described above, may contain variables to be expanded by the ad server (e.g., server 125).

The tracking URL, as described above, may be provided by advertiser 130 to the ad network for which they would like to perform conversion tracking. In other implementations, server 120 may automatically up-load the tracking URL to various ad networks. In either case, the ad network providing the ad to clients is aware of the tracking URL and embeds the tracking URL in the ad output to clients 110.

After conversion tracking is enabled and a tracking URL has been generated, a snippet may be provided, if necessary, to advertiser 130 (act 630). For example, if advertiser 130 has already enabled conversion tracking for the same ads provided by server 120 that advertiser 130 wishes to conversion track via server 125, the appropriate snippet(s) will already have been provided to advertiser 130, as described above with respect to FIG. 4. In this case, acts 630 and 640, described below, may be bypassed since the snippet(s) will have already been inserted in the appropriate ad(s) and these same snippet(s) may be used for external conversion tracking.

In the event that advertiser 130 has not enabled internal conversion tracking for the desired ad(s), server 120 may generate a snippet that allows clients 110 and/or advertiser 130 to pass information to conversion tracker 145 in a manner similar to that described above with respect to FIG. 4. For example, the snippet may include a pointer to conversion tracker 145 (e.g., googleadservices.com). The snippet may also include the conversion tracking ID assigned to advertiser 130. The snippet may further include "value" and "label" parameters that can be dynamically generated and appended to a conversion image/text request. The value parameter may represent an advertiser defined unit or value associated with a conversion specified in any units (e.g., dollars). The label parameter may be a free form text label that can be assigned to differentiate types of conversions that may be used in a final report (e.g., "purchase," "registration," "mailing list signup," "page view," "download," etc.). The set of available labels may be predefined and any requests not included within the predefined list may be marked as an unknown label type. The label parameter may also be set dynamically, per page, to advertiser specific custom labels. The format parameter defines the size of the post conversion page image that may be returned to client 110 when a conversion is achieved. In alternative implementations, no image may be returned after a conversion occurs or text may be returned.

Server 120 may also provide a JS wrapper and instructions to advertiser 130 that facilitate setting the value and label parameters and pasting the snippet into the appropriate page in a similar manner as described above with respect to FIG. 4. For example, conversion tracker 145 may provide a number of snippets that may be pasted into a number of advertiser pages. The JS wrapper may facilitate setting the values and labels in each snippet based on the particular item/product associated with the conversion. For example, as discussed above, if advertiser 130 sells only three products having prices of $50, $100 and $200, server 120 may provide three snippets and advertiser 130 may set the value in each snippet to the values $50, $100 and $200, respectively. Alternatively, server 120 may set the values in each snippet and also include the appropriate label for each snippet, based on information received from advertiser 130.

After advertiser 130 receives the snippet(s), along with instructions associated with the snippet(s), the snippet(s) may be pasted into the appropriate post conversion page(s) on advertiser 130's web site (act 640). As described previously, each advertiser may define what acts are considered conversions. When a client 110 performs such a predefined act, a conversion has taken place. For example, a purchase, a registration, a page view, a sign-up, a download, etc., may be considered a conversion. In each case, a post-conversion page provided by advertiser 130 may be displayed to client 110. For example, as described above, advertiser 130 may provide a web page to client 110 after client 110 has transmitted a credit card number to advertiser 130 for purchasing a particular product. When advertiser 130 receives the credit card information, the purchase has been completed and advertiser 130 may provide a page that states "Your purchase has been completed. Your total charges are X." Such a page may represent a post-conversion page.

After advertiser 130 pastes the snippet(s) into the appropriate post conversion page(s), external conversion tracking is enabled for advertiser 130. The process for external conversion tracking may then commence in a manner that is transparent with respect to advertiser 130.

Figure 7:
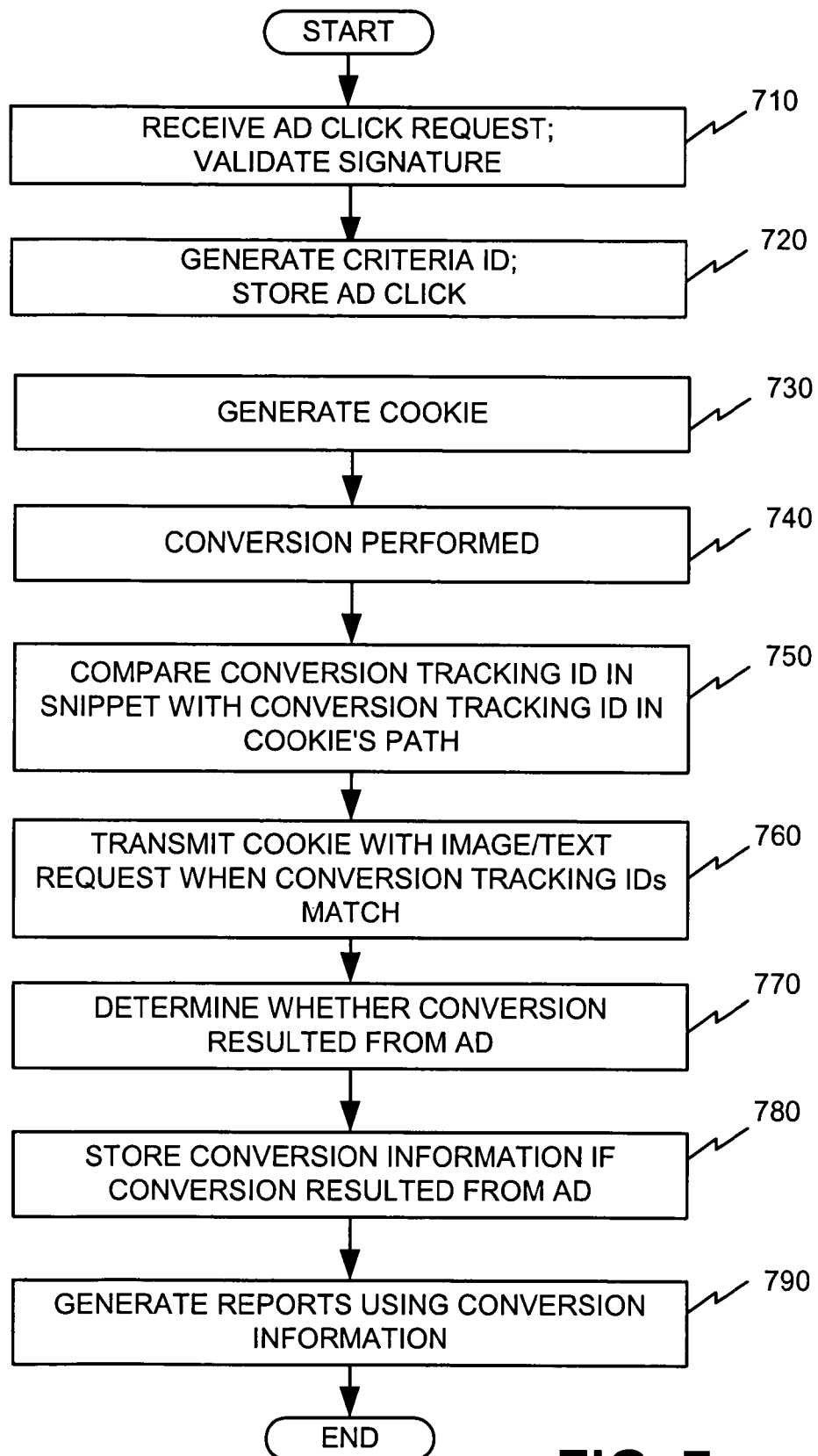
FIG. 7 is a flow diagram illustrating exemplary processing associated with external conversion tracking according to an implementation consistent with the principles of the invention.
Figure 8:
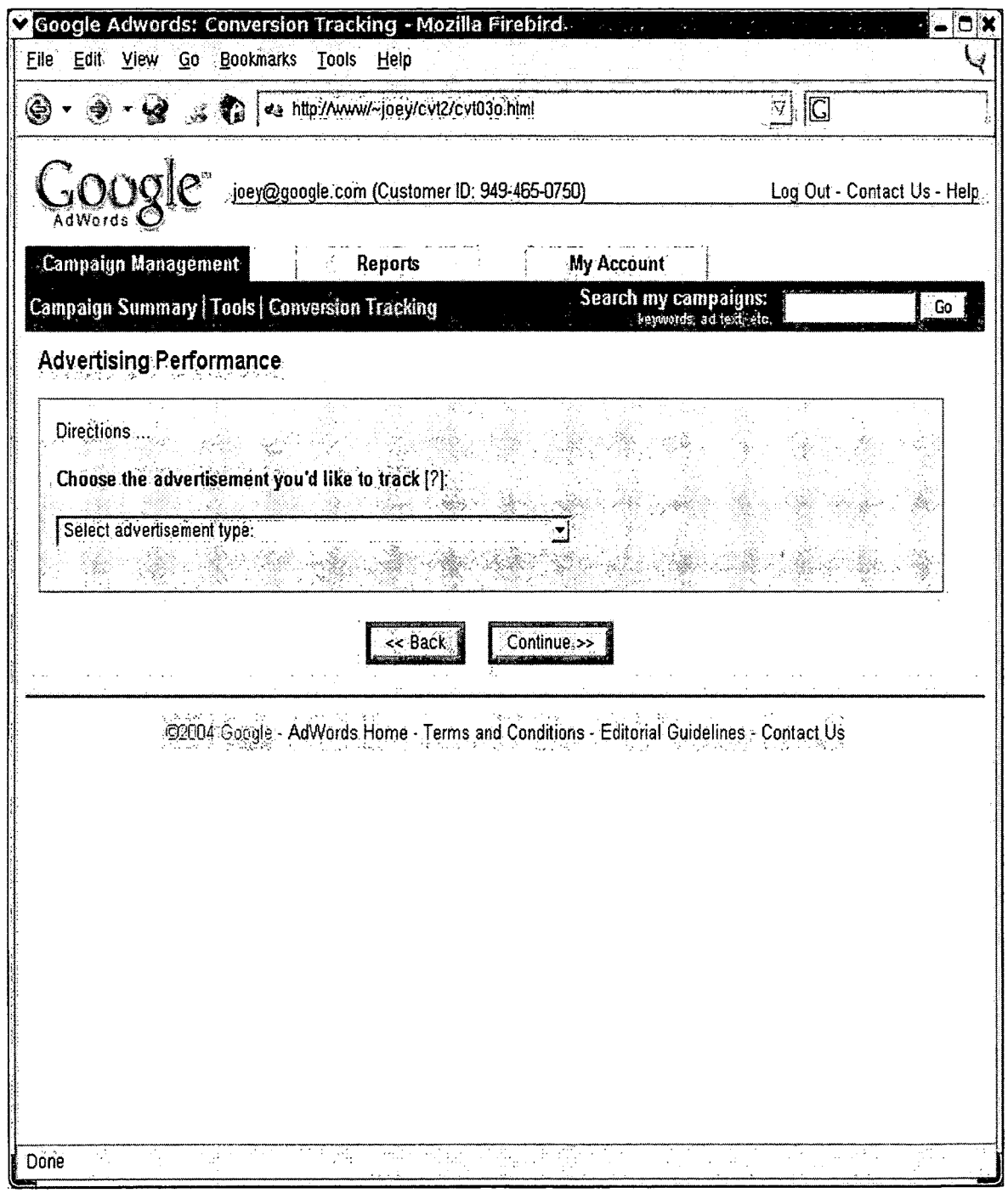
Figure 9:
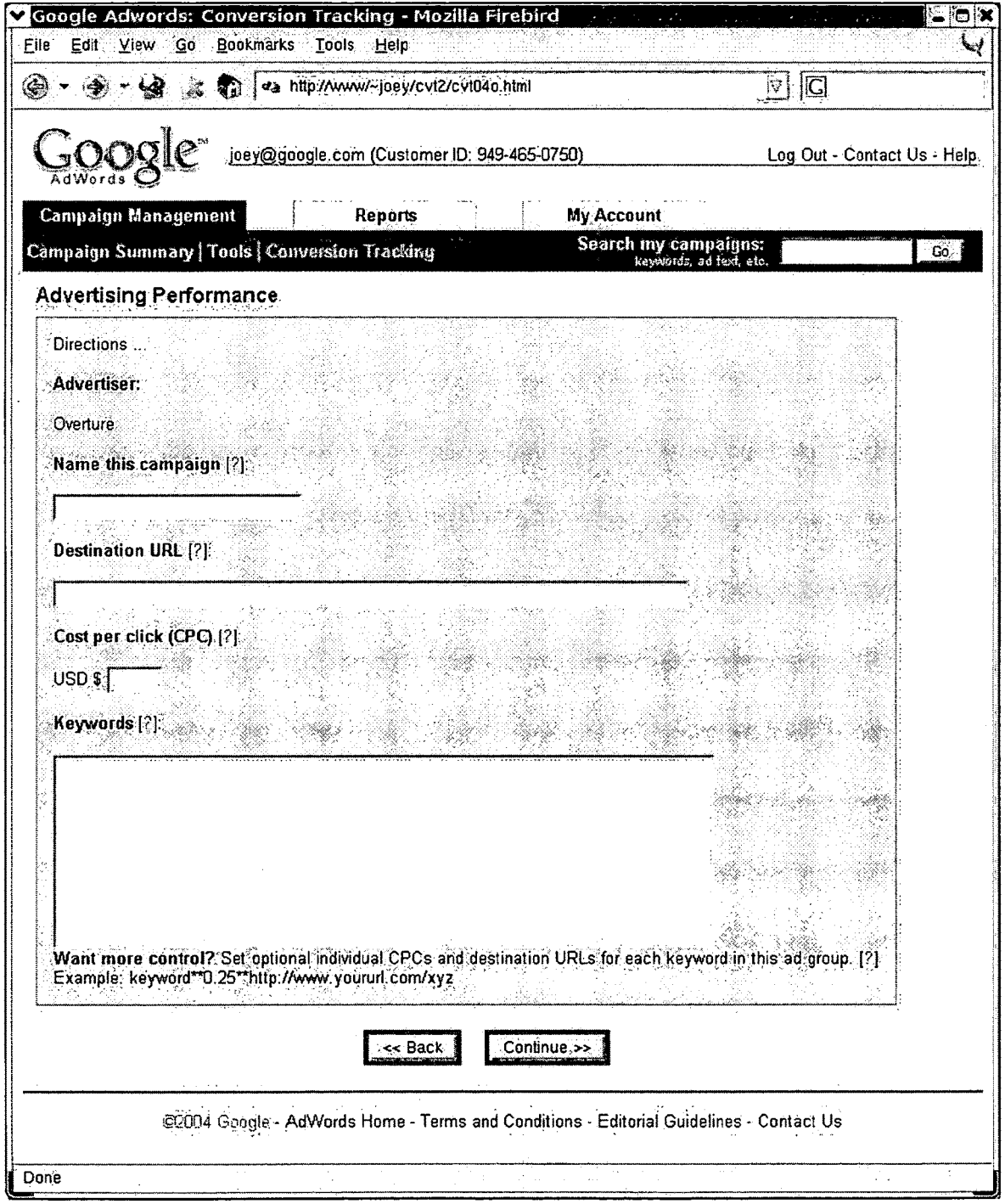
Figure 11:
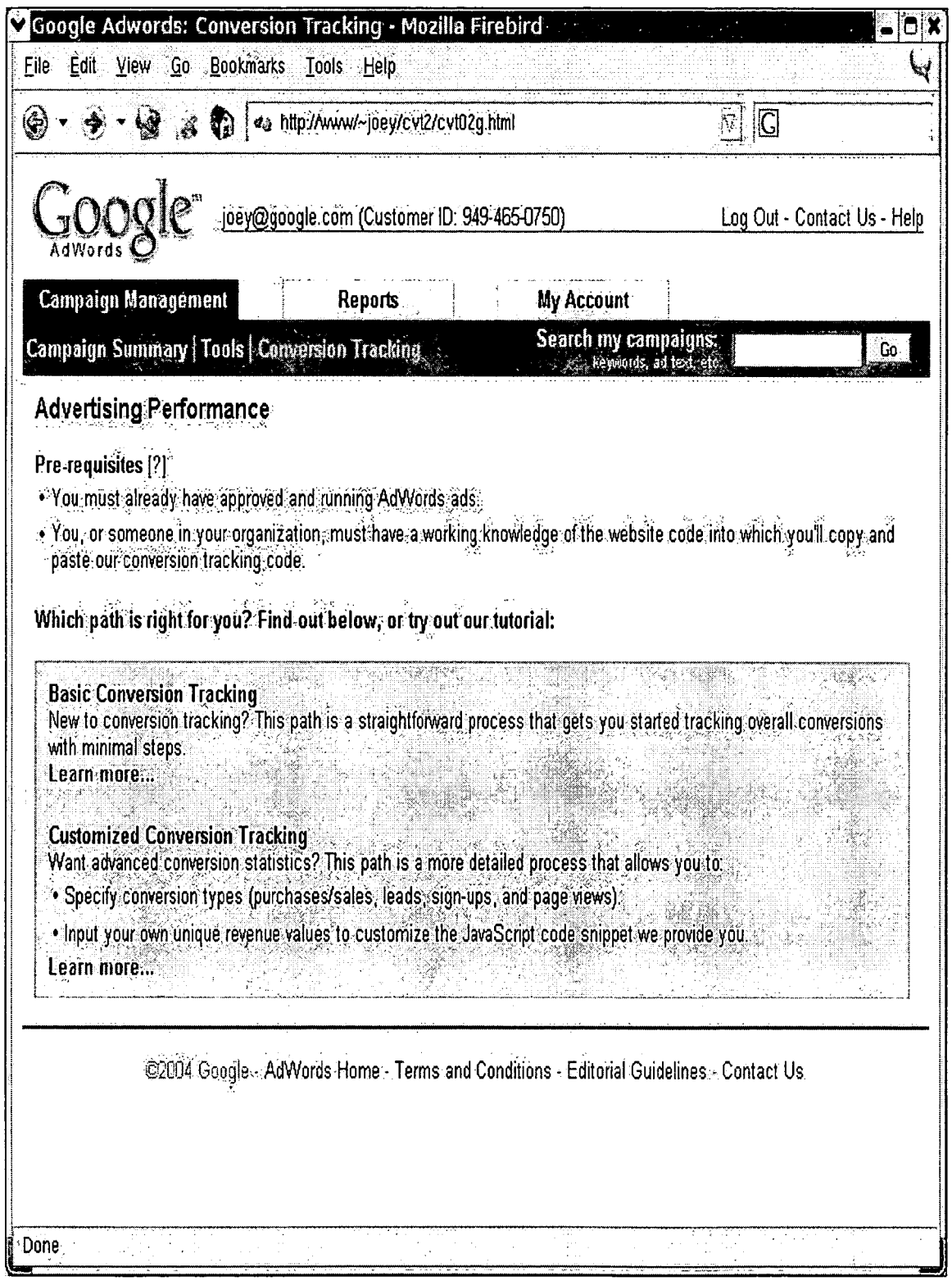
Figure 12:
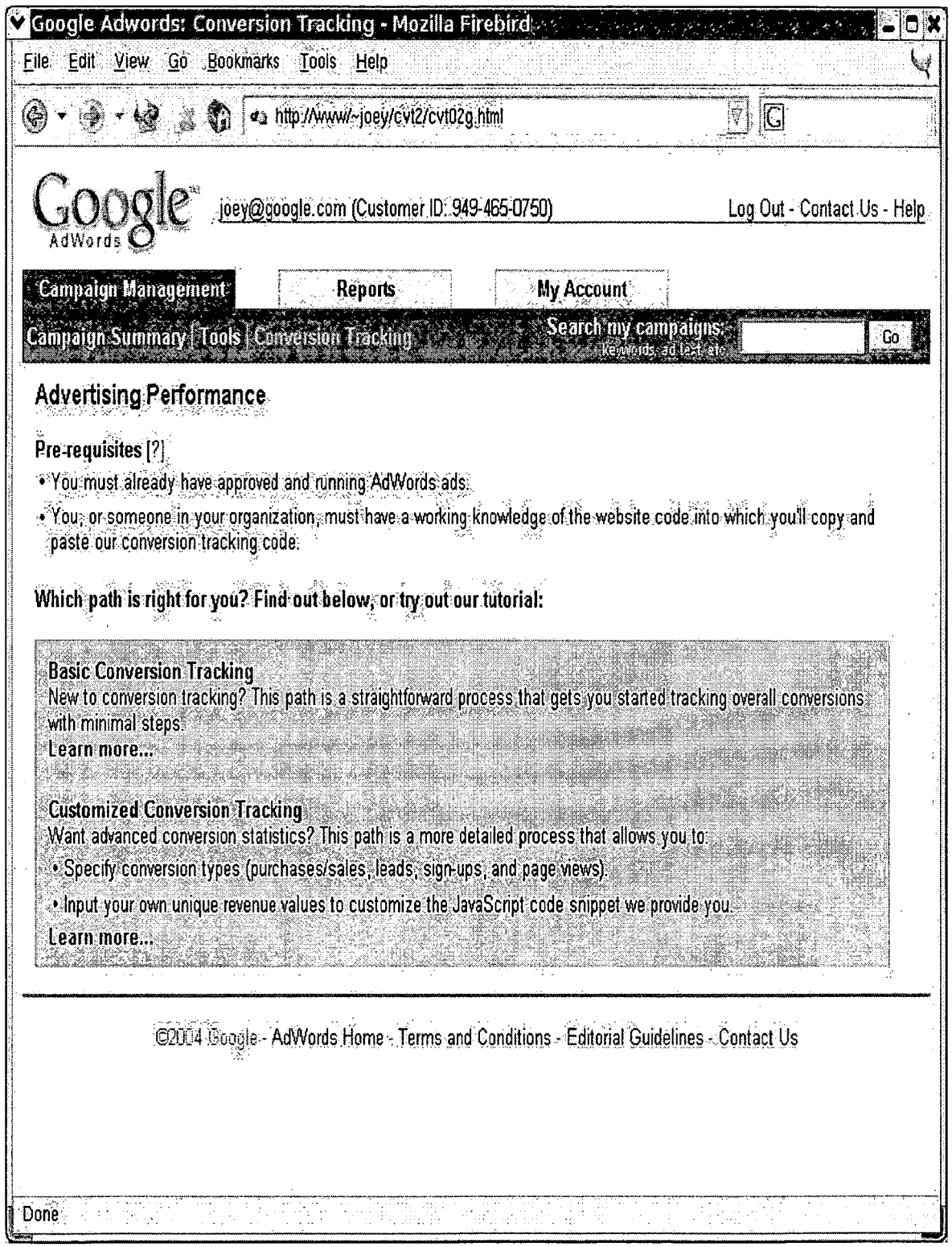
Figure 13:
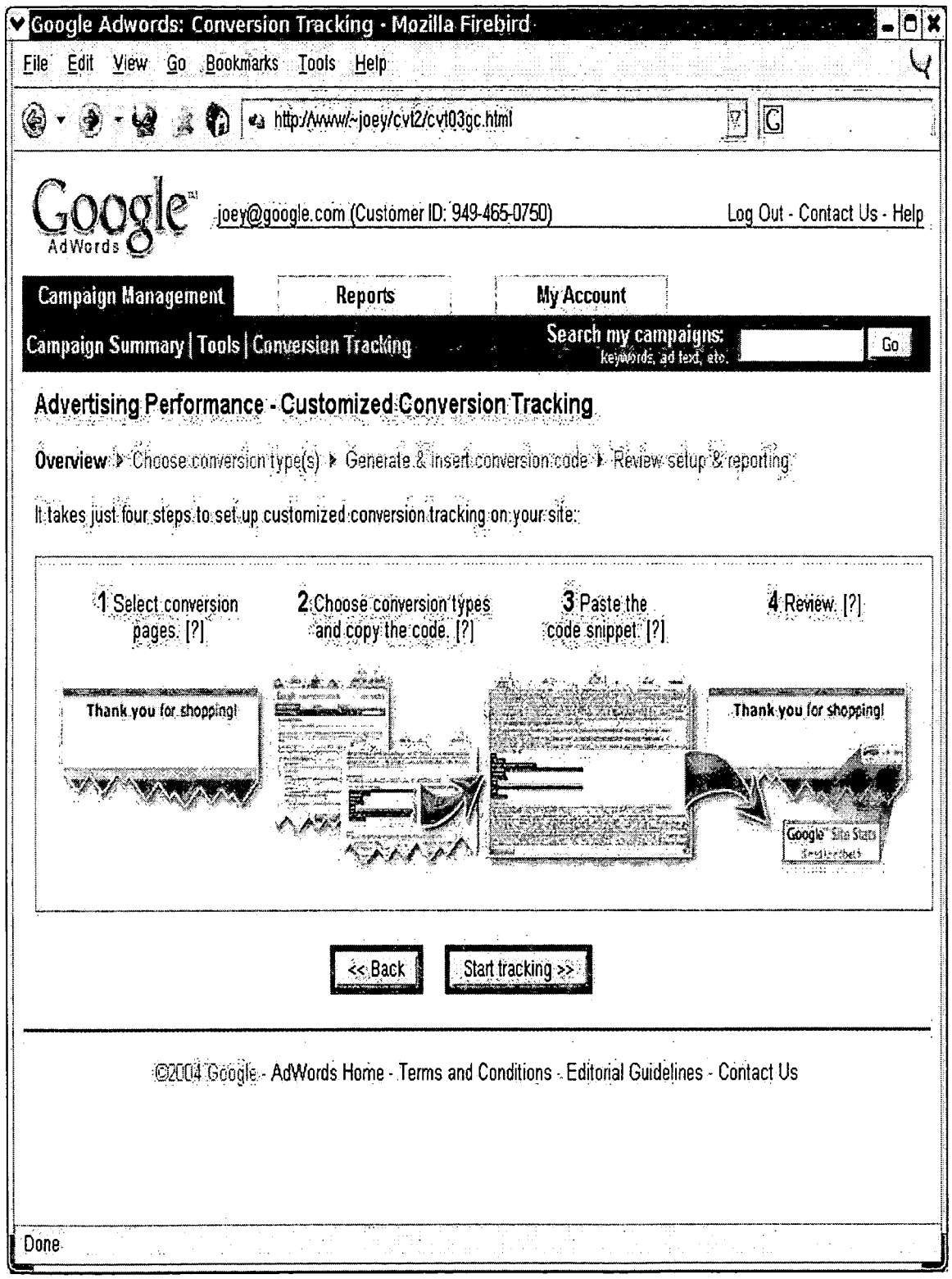
Figure 15:
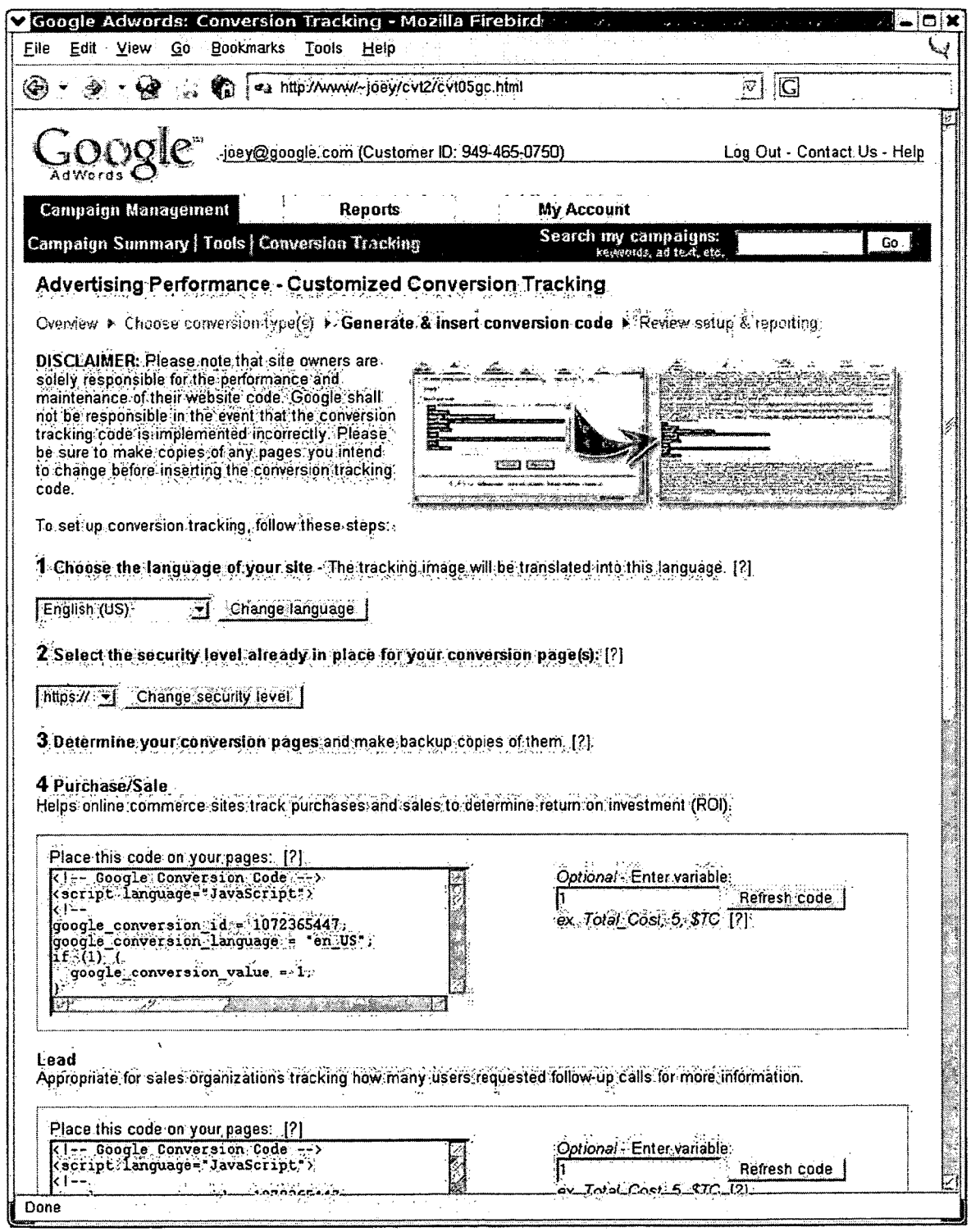
Figure 16:
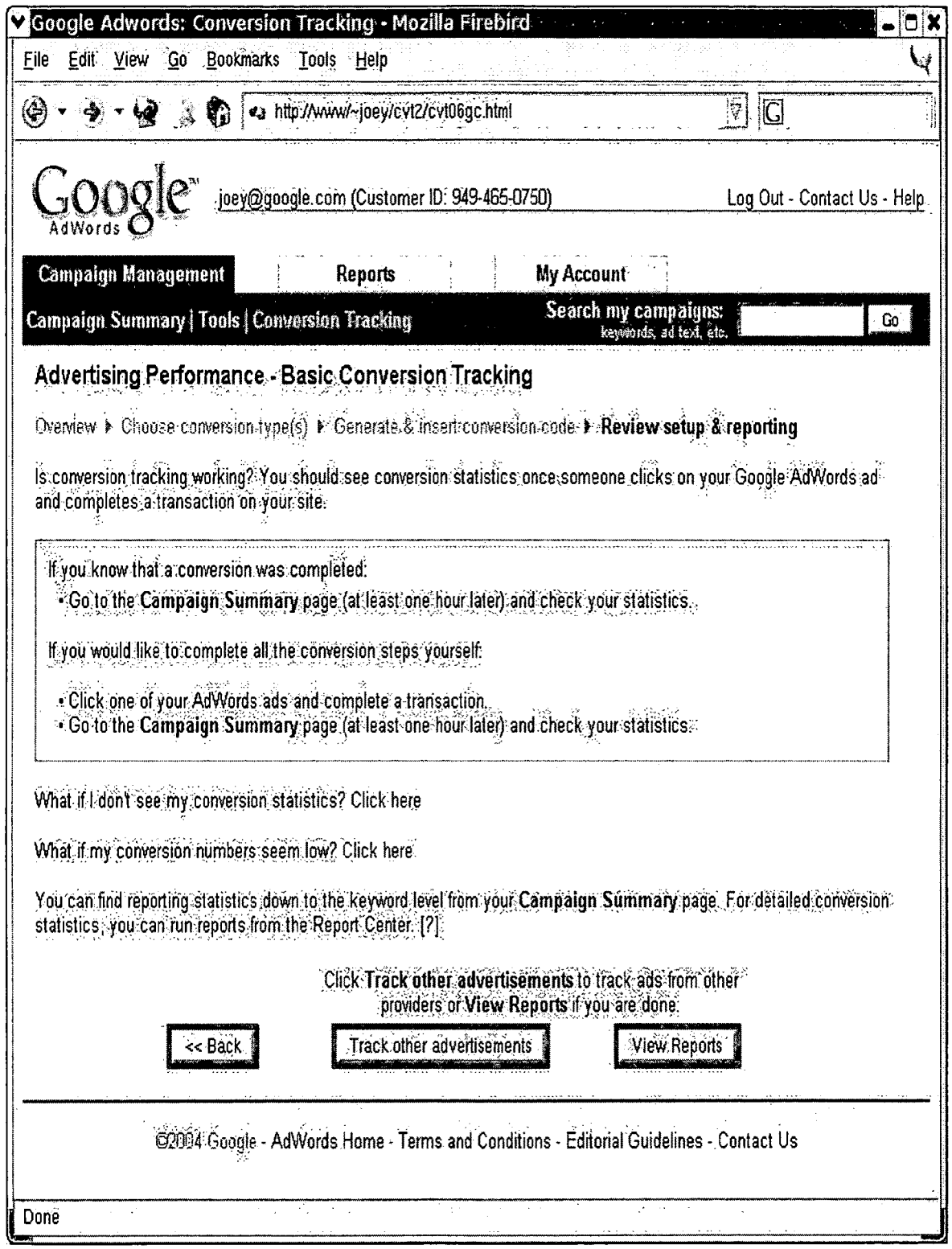

FIG. 7 is a flow diagram illustrating exemplary processing associated with external conversion tracking according to an implementation consistent with the principles of the invention. The processing described below is similar to that described above with respect to FIG. 5 and uses the example of conversion tracking associated with ads that are provided based on search queries. However, as discussed above, the techniques described herein may be used in any system in which particular user actions are to be determined/identified.

Processing may begin with a client 110 accessing server 125 via network 150 and receiving a UI for entering a search query. Assume that the user enters a search query and transmits the search query to server 125. Server 125 receives the search query, executes the search and generates a list of search results.

Server 125 may also identify advertiser(s) based on the search query. For example, when server 125 receives a query, server 125 may determine whether any advertiser has purchased advertising associated with one or more terms in the search query. Server 125 may then identify the advertiser(s) associated with the query and the particular ads associated with the query. Server 125 may also transmit the search results and advertisement(s) to client 110 for display. The advertisements may include text and links to the respective advertisers' web sites.

Assume that a user, via client 110, performs an ad click on an ad associated with an advertiser that has enabled external conversion tracking. For example, assume that advertiser 130 has enabled conversion tracking for a particular ad provided by server 125 and that a user, via client 110, clicks on the ad associated with advertiser 130.

After client 110 selects the ad, an ad click request may be received as a result of the tracking URL in the ad (act 710). For example, as discussed above, advertiser 130 may include a tracking URL in ads for which conversion tracking is desired. When the ad is selected or clicked, the tracking URL sends the ad click to conversion tracker 145.

In an exemplary implementation, the click information field in the ad click may be decoded and the signature of the ad click may be validated (act 710). For example, the ad click information field may include a signature computed using a secret key along with other information identifying a particular ad. The secret key is not known by advertiser 130 or other parties and is control by parties associated with conversion tracker 145. When conversion tracker 145 receives the ad click information, FE 310 (FIG. 3) may use the information identifying the ad and the secret key to compute the signature. If the computed signature does not match the received signature, FE 310 determines that the information may have been tampered with and performs no additional processing with respect to the ad click.

In some implementations consistent with the present invention, FE 310 may also redirect the ad click request back to itself, as described above with respect to FIG. 5, to ensure that clicks by web crawlers are not counted in the number of ad clicks associated with an advertiser. This may also prevent spamming by automated crawlers that lack this redirect following feature.

FE 310 may also send an external ad click request to ad mixer 320. A criteria ID may then be generated (act 720). For example, ad mixer 320 may generate a criteria ID associated with the ad click by accessing one or more databases that include ad related keywords/phrases and corresponding criteria IDs. Each criteria ID may represent a keyword or phrase upon which advertisers bid. In other words, the criteria ID maps the keyword/phrase to a corresponding identifier, such as a numerical identifier. In addition, multiple criteria IDs may exist for a particular query. For example, suppose that the ad click information indicates that a search query input to server 125 was "car." The term "car" may be associated with the exact query "car," as well as the word "car" used anywhere in a query. Advertisers may bid on both uses of the word "car" and therefore, multiple criteria ID may exist for a particular query.

Ad mixer 320 may identify the user query in the ad click information received from FE 310 and search the database(s) for the criteria ID. The databases(s) may also include ad group ID information. In this case, ad mixer 320 may restrict the search of the database(s) to the particular ad group ID identified in the ad click information. In either case, ad mixer 320 may search the appropriate database(s) and identify a criteria ID that matches the particular query. If more than one criteria ID matches the query, ad mixer 320 may select the first matching criteria ID.

In the event that no matching criteria ID is found, this may indicate that the particular ad creative does not exist in the particular ad group to which this creative belongs. In this case, ad mixer 320 may set the criteria ID to a null value. This may also be done if no keywords are included in the external ad click received from FE 310. Using a null value as the criteria ID may be used to prevent conversion tracker 145 from reporting on keywords that an advertiser has not bid on and/or conversion tracker 145 may report these clicks under an "unknown" keyword.

The ad click may also be stored in a log file (act 720). For example, ad mixer 320 may store the ad click information in a log file and may include the criteria ID with the ad click information. In some implementations, the external ad click information may be stored in a separate log file from internal ad clicks. In other implementations, a single log file for all ad clicks may be used.

Ad mixer 320 may also return a click response to FE 310. The click response may also be augmented to include the criteria ID. Ad mixer 320 may further identify the approximate time that the ad click occurred and generate an ad click time stamp (TS) in a manner similar to that described above with respect to FIG. 5. The TS may be a globally unique identifier that includes the time that ad mixer 320 received the ad click request. The TS may also include other information, such as server IP address/host processor ID, etc., to ensure that the TS is globally unique. Ad mixer 320 may then generate a message including the TS, a conversion tracking ID and a Boolean indicating that a cookie should be set. Ad mixer 320 may forward this message to FE 310.

FE 310 receives the message from ad mixer 320 and determines that a conversion tracking cookie is to be set. A conversion tracking cookie may then be generated (act 730). In an exemplary implementation, the conversion tracking cookie may include external click information received with the ad click. The external click information may be used in a manner similar to the click string that is included in the cookie for internal clicks, as described above with respect to FIG. 5.

For example, the external click information may include information identifying the particular ad click(s) or action(s) performed by the user. The conversion tracking cookie may also include the ad click TS and/or an expiration date associated with the cookie. The conversion tracking cookie may also include the conversion tracking ID of advertiser 130 and the criteria ID generated at act 720. The conversion tracking cookie may further include a flag indicating that the conversion is associated with an external conversion.

FE 310 may send the cookie to client 110 along with a message instructing client 110 to set the cookie in a manner similar to that described above with respect to FIG. 5. Client 110 may then set the cookie. Similar to the description above with respect to FIG. 5, the cookie may include the domain googleadservices.com, corresponding to server 140, and a path that includes the conversion tracking ID associated with advertiser 130. The conversion tracking ID may ensure that the cookie will not be forwarded to conversion tracker 145 when conversions associated with other advertisers are performed, as described in more detail below.

FE 310 may also issue a redirect to advertiser 130's target destination. The target destination is the URL found in the original ad click request (e.g., the "url=parameter"). Client 110 may then access advertiser 130's target destination page.

Assume that an act defined by advertiser 130 to be a conversion for that particular advertiser is performed (act 740). For example, client 110 may perform a conversion with respect to advertiser 130. In this case, when client 110 performs the conversion, advertiser 130 downloads a post conversion page to client 110. As discussed above with respect to FIGS. 4 and 6, the post conversion page includes the snippet provided to advertiser 130. When client 110 receives and displays the post conversion page, client 110 executes the snippet. The snippet, as described previously, may include the conversion tracking ID associated with advertiser 130. When the snippet is executed, client 110 sends the image/text request to conversion tracker 145. This image/text request may include information indicating that a conversion occurred, the conversion tracking ID, a value, a label and a format for the image (assuming the request is an image request).

Client 110 may also compare the conversion tracking ID included in the snippet with the conversion tracking ID in the cookie in a similar manner as that described above with respect to FIG. 5 (act 750). That is, client 110 compares the conversion tracking ID included in the snippet on advertiser 130's post conversion page with the conversion tracking ID included in the cookie. When the conversion tracking IDs match, client 110 transmits the cookie, along with the post conversion image/text request, to conversion tracker 145 (act 760).

It should be understood that client 110 may receive a number of cookies from conversion tracker 145 when client 110 performs ad clicks associated with various conversion tracking enabled advertisers in a manner similar to that discussed above with respect to advertiser 130. Each time client 110 receives a post conversion snippet, client 110 may compare the conversion tracking ID in the post conversion snippet with the conversion tracking IDs included in the cookie path for each of the cookies stored on client 110. When the conversion tracking ID in the snippet matches any one of the conversion tracking IDs in a cookie path of a stored cookie, client 110 will send that cookie to conversion tracker 145.

When the conversion tracking ID does not match any of the conversion tracking IDs in a cookie path of a stored cookie, client 110 will not send a cookie to conversion tracker 145. Reducing the number of times cookies are sent reduces the ability of conversion tracker 145 to track user actions. This may reduce privacy concerns of privacy sensitive users. In other implementations consistent with the present invention in which privacy concerns are not as great, client 110 may send cookies associated with conversion tracking enabled advertisers when no conversions for those advertisers have occurred. In this manner, conversion tracker 145 may identify more actions performed by users.

In some implementations, client 110 may also examine the TS, if a TS is included in the cookie, to determine whether to send the cookie to conversion tracker 145. For example, if client 110 determines that the cookie has expired, client 110 may not send the cookie. Conversion tracker 145, however, may also look at the TS, as described below.

Assuming that the conversion tracking ID in the snippet matches the cookie associated with advertiser 130 (and optionally, the TS indicates that the cookie has not expired), client 110 sends the cookie for advertiser 130 and the post conversion image/text request to conversion tracker 145. A determination may then be made as to whether the conversion resulted from an advertisement (act 770).

For example, when conversion tracker 145 receives the image/text request, conversion tracker 145 may examine the request and determine whether the cookie with the unique conversion tracking ID associated with advertiser 130 has been received with the image/text request or in close time proximity to the image/text request. If conversion tracker 145 does not find such a cookie included with the image/text request, FE 310 may determine that the conversion did not result from an advertisement. If FE 310 has received such a cookie with the image/text request (or in close time proximity with the image request), FE 310 may determine whether the cookie has expired based on the expiration date or TS information included with the cookie.

Assume that conversion tracker 145 determines that the conversion resulted from the ad and the cookie has not expired. In this case, information associated, with the conversion may be stored (act 780). For example, the cookie may include the external conversion flag that indicates that the conversion represents an external conversion. The cookie may also contain other data such as a value and type associated with the conversion. The cookie may further contain information that identifies the ad that was clicked on that resulted in the conversion.

FE 310 may also return an image/text to client 110 that states, for example, "Thank you for shopping, some of your actions have been tracked for the merchant/seller." The image/text may also indicate the entity performing the conversion tracking and/or may also identify the ad provider associated with the conversion. Client 110 may then paste this image/text into the post conversion page displayed on client 110. Providing this information in the post conversion page allows clients 110 to be aware that some of their actions are being tracked. If FE 310 determines that the conversion did not result from a paid ad or that the cookie associated with the paid ad had expired, conversion tracker 145 may not store the conversion information. FE 310 may also return a blank image or no image/text and client 110 will not receive any additional message on the post conversion page.

FE 310 may also send a message to ad mixer 320 indicating that an external conversion occurred. Ad mixer 320 may log the conversion event in an ad conversion log. In some implementations, the ad conversion log may store conversion information for both internal and external conversions. In other implementations, separate conversion logs may be used for internal and external logs. In each case, the ad conversion log may include records, such as a number of conversion events, a value associated with each conversion event, a label associated with each conversion event, a time associated with each conversion event, the search engine or ad network associated with each conversion event, etc. Log processing module 330 (FIG. 3) may access the ad conversion log and use the ad conversion data to populate a conversion events database. Various reports may then be generated based on information in the conversion events database (act 790).

For example, log processing module 330 may generate a number of statistics for a particular advertiser, such as advertiser 130, with respect to each particular ad network upon which the advertiser purchases ads. One statistic may be a conversion ratio associated with an ad. The conversion ratio may be based on a number of conversions that resulted from a displayed ad divided by the number of times the displayed ad was clicked at least once. By generating the conversion ratio, both advertisers and search engine providers may determine the effectiveness of the paid ads. Log processing module 330 may also determine a total value of all conversions over a period of time for a particular advertiser that resulted from ads from each ad provider, a value per click, etc.

More detailed analysis of advertisements can also be made. For example, log processing module 330 may generate keyword reports for specific ad groups and ad campaigns. This report may show the conversion rate for each PPC network versus the conversion rate for internal ads. This report enables an advertiser to compare the effectiveness of ads on various networks. For example, an advertiser may wish to compare how the keyword "fast cars" converts on network A relative to network B. The comparison may include conversion ratios for each network and other pertinent information desired by the advertiser.

In addition, for non-PPC networks, such as those providing banner ads, the report may include the ability for an advertiser to specify channels. A channel may be an advertiser-defined grouping of ads for reporting purposes. For example, some of the channels may include banner ads, annoying banner ads, super flash ads, etc. The reports may then include information indicating conversion information for each of these channels. In this manner, an advertiser may gain insight into the effectiveness of various types of ads.

Advertisers may also interact with conversion tracker 145 to customize various reports based on their own particular needs. For example, advertisers may group their ads/ad creatives into any number of logical channels. Advertisers may also modify existing channels or create new channels based on the particular reports that they would like to receive. Log processing module 330 may also generate any number of additional reports based on their own particular needs.

Figure 17:
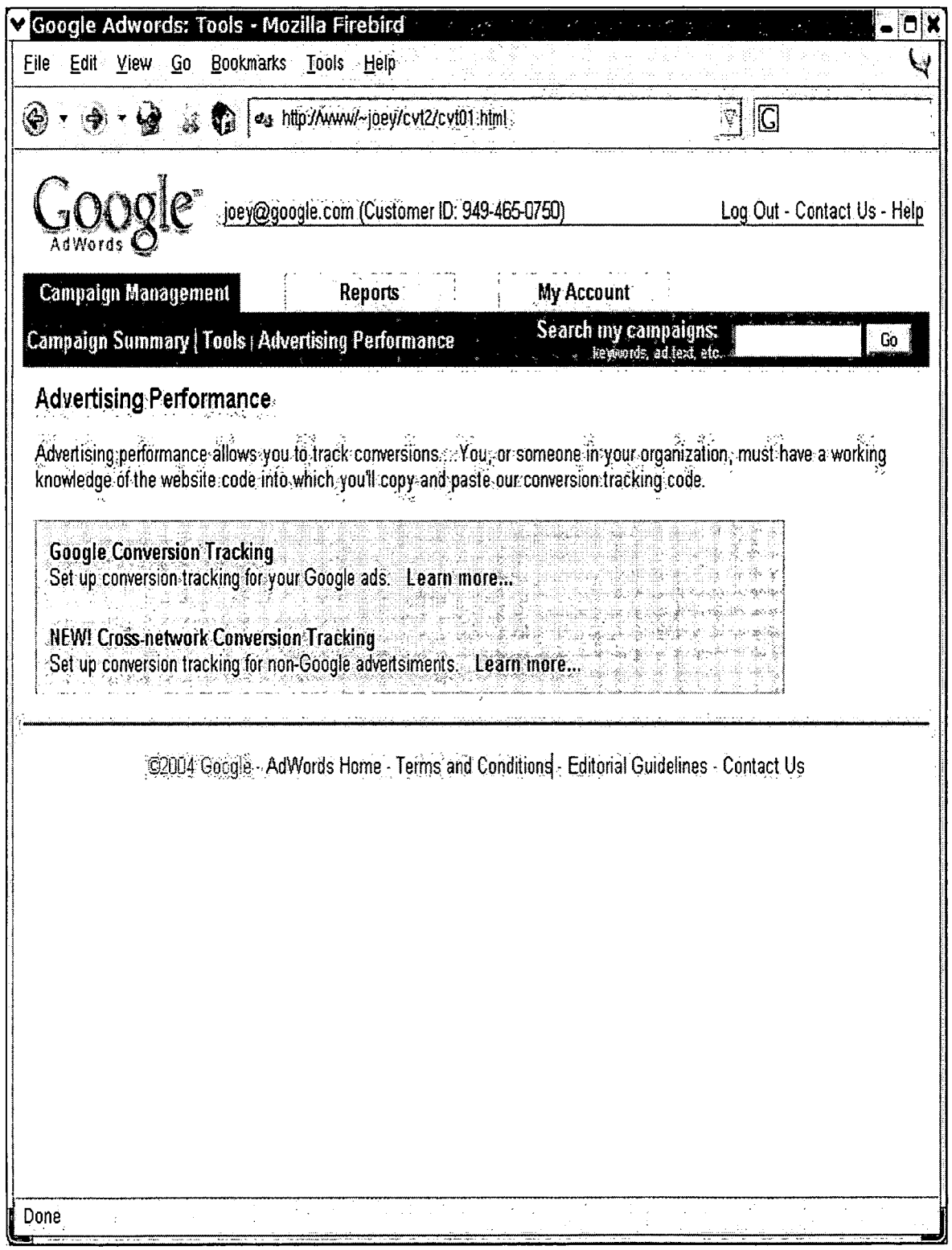

FIGS. 8-17 illustrate exemplary UI screens that may be used in implementations consistent with principles of the invention. For example, UI screens 800, 900 and 1000 illustrated in FIGS. 8-10, respectively, illustrate exemplary UI screens associated with external conversion tracking. UI screens 1100, 1200, 1300, 1400, 1500 and 1600 illustrated in FIGS. 11-16, respectively, illustrate exemplary UI screens associated with internal conversion tracking. UI screen 1700 illustrated in FIG. 17 illustrates an exemplary UI screen that allows an advertiser to select internal or external conversion tracking. It should be understood that the UI screens in FIGS. 8-17 are exemplary only and modifications to these screens, as well as other screens, may be used in implementations consistent with the principles of the invention.

CONCLUSION

Implementations consistent with the principles of the invention may provide conversion tracking with respect to internal and external ad providers/networks.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 4-7, the order of the acts may be varied in other implementations consistent with the present invention. Moreover, non-dependent acts may be implemented in parallel.

Also, implementations consistent with principles of the invention have been described with respect to setting cookies on advertiser specific paths when an ad click is received. In other implementations, a cookie could be set on an ad impression. In this manner, a "view through" conversion may be captured. A view through conversion may be defined as a conversion that occurred just by viewing the ad impression. Browsers, however, often limit the number of cookies that may be stored. To overcome this potential problem, a single cookie may be set to be associated with all the ad impressions.

In further implementations, a single cookie could be used for multiple advertisers. Such a cookie could then be used to track ad clicks associated with any one of the multiple advertisers. Conversion tracker 145 could then determine which ad clicks were associated with which particular advertiser based on information transmitted with the cookie. In this manner, conversion tracker 145 would be able to determine a conversion ratio for each advertiser.

Further, in alternative implementations, instead of providing a tracking URL as described above, a snippet may be included on the landing page associated with each ad. The snippet may then be used to extract ad network information by looking at the browser's referrer. For example, the snippet would extract the ad network information and forward that information to conversion tracker 145.

Implementations consistent with principles of the invention have also been described as receiving an image/text request when a conversion occurred. The image/text request has been described as being transmitted by a client device when it receives a particular web page from an advertiser. In alternative implementations, the advertiser may transmit information to conversion tracker 145 indicating that a conversion occurred. The conversion information may include optional value and label parameters. In this case, conversion tracker 145 may not need to generate cookies to track the user's actions. That is, conversion tracker 145 may store an indication that an ad click for a paid advertiser was received at a certain time. When conversion tracker 145 receives a conversion indication from a particular advertiser, conversion tracker 145 may correlate that conversion information to the stored ad click information to determine whether the conversion resulted from an ad.

Lastly, it will be apparent to one of ordinary skill in the art that aspects of the invention, as described above, may be implemented in many different forms of software, firmware and hardware. The actual software code or specialized control hardware used to implement aspects consistent with the principles of the invention is not limiting of the present invention. Thus, operation and behavior of the aspects were described without reference to specific software code, it being understood that one of ordinary skill in the art would be able to design software and control hardware to implement the aspects based on the description herein. In addition, acts described as being performed by one server, such as server 120 or server 145, may also be performed by another device. Further a single server or system may be used to perform the acts of both servers 120 and 145.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phase "based on" is intended to mean "based, at least in part, on" unless explicitly stated otherwise.

What is claimed is:

1. A method for tracking user activity, the method comprising:
   receiving, at one or more processors of a first entity, a request for a document from a client device, the request comprising a keyword associated with the document and client parameters corresponding to the client device;
   determining, by the one or more processors, client cookie data using the client parameters, the client cookie data stored in a storage of the first entity;
   determining, by the one or more processors, document information based on the keyword associated with the document;
   identifying, by one or more processors, a plurality of content items corresponding to the keyword, the document information, and the cookie data, each of the plurality of content items having a bid value;
   selecting, by the one or more processors, a first content item of the identified plurality of content items based on a first bid value, the client cookie data, and the document information, wherein the first content item includes a link to another document;
   transmitting, by the one or more processors, the document with the first content item in response to the request, the first content item associated with the first bid value, the client cookie data, and the document information of the document, the first content item including a tracking identifier; and
   receiving, by the one or more processors, conversion data associated with the tracking identifier in response to a user interaction with the another document, the conversion data including a type of user action and data describing whether the user interaction is an internal conversion or an external conversion.

2. The method of claim 1, the user interaction corresponding to at least one of a purchase, a registration, a sign-up, a page view or a download.

3. The method of claim 1 further comprising:
   tracking conversion data associated with advertisements provided by a second entity, the second entity being different from the first entity; and
   comparing conversion data associated with the first entity with conversion data associated with the second entity.

4. The method of claim 3 where the comparing conversion data comprises:
   comparing a conversion ratio for the first content item provided by the first entity with a conversion ratio for a second content item provided by the second entity.

5. The method of claim 1 further comprising:
   receiving a request for conversion tracking from an advertiser, the request being associated with tracking conversions relating to the first content item provided by the first entity.

6. The method of claim 5, further comprising:
   providing software to be included on a web site of the advertiser in response to the request for conversion tracking, the software including at least one of a value field or a label field associated with a conversion.

7. The method of claim 1, further comprising:
   generating conversion data for the first content item provided by the first entity;

generating a report based on the conversion data; and
providing the report to an advertiser associated with the first content item.

8. The method of claim 7, wherein the generating conversion data comprises:
   determining a number of times the first content item has been displayed or selected;
   determining a number of conversions resulting from the display or selection of the first content item; and
   generating a conversion ratio for the first content item based on the number of times the first content item has been displayed or selected and the number of conversions resulting from the display or selection.

9. The method of claim 1, further comprising:
   determining that a conversion resulted from the first content item based on receipt of the client cookie data.

10. The method of claim 1, wherein the client cookie data includes a first identifier representing an advertiser and a second identifier associated with the first entity.

11. The method of claim 10, where a third-party serving entity represents an external ad provider with respect to first serving entity with which the one or more processing devices are associated.

12. The method of claim 1, further comprising:
   tracking conversion data associated with a second entity, the second entity not being affiliated with the first entity.

13. The method of claim 12, further comprising:
   generating conversion data associated with the first entity and the second entity.

14. The method of claim 13, further comprising:
   generating a report including the conversion data associated with the first entity and the second entity.

15. A system for tracking user activity, comprising:
   one or more processors of a first entity; and one or more storage devices storing instructions that, when executed by the one or more processors, cause the one or more processors to perform operations comprising:
      receiving a request for a document from a client device, the request comprising a keyword associated with the document and client parameters corresponding to the client device;
      determine client cookie data using the client parameters, the client cookie data stored in a storage of the first entity;
      determine document information based on the keyword associated with the document;
      identifying a plurality of content items corresponding to the keyword, the document information, and the cookie data, each of the plurality of content having a bid value;
      selecting a first content item of the identified plurality of content items based on a first bid value, the client cookie data, and the document information, wherein the first content item includes a link to another document;
      transmitting the document with the first content item in response to the request, the first content item associated with the first bid value, the client cookie data, and the document information of the document, the first content item including a tracking identifier; and
      receiving conversion data associated with the tracking identifier in response to a user interaction with the another document, the conversion data including a type of user action and data describing whether the user interaction is an internal conversion or an external conversion.

16. The system of claim 15, wherein the user interaction corresponds to at least one of a purchase, a registration, a sign-up, a page view or a download.

17. The system of claim 15, wherein the one or more storage devices stores instructions that cause the one or more processors to perform further operations comprising:
   tracking conversion data associated with advertisements provided by a second entity, the second entity being different from the first entity; and
   comparing conversion data associated with the first entity with conversion data associated with the second entity.

18. The system of claim 17, wherein the one or more storage devices stores instructions that cause the one or more processors to perform further operations comprising:
   comparing a conversion ratio for the first content item provided by the first entity with a conversion ratio for a second content item provided by the second entity.

19. The system of claim 15, wherein the one or more storage devices stores instructions that cause the one or more processors to perform further operations comprising:
   receiving a request for conversion tracking from an advertiser, the request being associated with tracking conversions relating to the first content item provided by the first entity.

20. The system of claim 19, wherein the one or more storage devices stores instructions that cause the one or more processors to perform further operations comprising:
   providing software to be included on a web site of the advertiser in response to the request for conversion tracking, the software including at least one of a value field or a label field associated with a conversion.

* * * * *